US009826540B1

(12) United States Patent
Li et al.

(10) Patent No.: US 9,826,540 B1
(45) Date of Patent: Nov. 21, 2017

(54) UPLINK TRANSMISSION IN SHORTENED TRANSMISSION TIME INTERVALS IN A WIRELESS COMMUNICATION SYSTEM

(71) Applicant: ASUSTeK COMPUTER INC., Taipei (TW)

(72) Inventors: Ming-Che Li, Taipei (TW); Li-Chih Tseng, Taipei (TW); Ko-Chiang Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/593,960

(22) Filed: May 12, 2017

Related U.S. Application Data

(60) Provisional application No. 62/335,541, filed on May 12, 2016.

(51) Int. Cl.
H04W 72/04 (2009.01)
H04W 72/10 (2009.01)
H04W 72/12 (2009.01)
H04L 1/18 (2006.01)
H04W 72/02 (2009.01)

(52) U.S. Cl.
CPC .......... H04W 72/10 (2013.01); H04L 1/1812 (2013.01); H04W 72/0446 (2013.01); H04W 72/1284 (2013.01)

(58) Field of Classification Search
USPC ................ 370/252, 278, 329, 455
See application file for complete search history.

(56) References Cited

U.S. PATENT DOCUMENTS

2007/0081498 A1* 4/2007 Niwano ............... H04W 72/10
                                                                  370/335
2016/0270116 A1* 9/2016 Lin .................... H04W 72/1289

OTHER PUBLICATIONS

"Beam Forming Impacts," 3GPP Tsg-RAN WG2 Meeting #93bis, Apr. 2016, R2-162366, Nokia, Alcatel-Lucent Shanghai Bell, Dubrovnik, Croatia, 3 pages.
"Discussion on terminology of beamforming based high frequency NR," 3GPP TSG-RAN WG2 Meeting #94, May 2016, R2-163716, Samsung, Nanjing, China, 4 pages.
"Beam support in NR," 3GPP TSG RAN WG2 Meeting #93bis, Apr. 2016, R2-162709, Intel Corporation, Dubrovnik, Croatia, 4 pages.

(Continued)

Primary Examiner — John Pezzlo
(74) Attorney, Agent, or Firm — Amin, Turocy & Watson, LLP

(57) ABSTRACT

Uplink transmission in shorted transmission time intervals is provided herein. A method can comprise receiving, by a device comprising a processor, a first downlink control information related to scheduling a first uplink data transmission via a first transmission time interval. The method can also comprise receiving, by the device, a second downlink control information related to scheduling a second uplink data transmission via a second transmission time interval, wherein the second uplink data transmission overlaps at least a symbol with the first uplink data transmission. The method can also transmitting, by the device, the first uplink data transmission or the second uplink data transmission based on prioritization determined based on a first length of the first transmission time interval and a second length of the second transmission time interval.

19 Claims, 18 Drawing Sheets

(56) References Cited

OTHER PUBLICATIONS

"Active Mode Mobility in NR: SINR drops in higher frequencies," 3GPP TSG-RAN WG2 #93bis, Apr. 2016, R2-162762, Ericsson, Dubrovnik, Croatia, 4 pages.

"Radio Access Architecture and Interfaces," 3rd Generation Partnership Project, Technical Specification Group Radio Access Network, Study on New Radio Access Technology, 3GPP TR 38.801, Apr. 2106, V0.1.0, Release 14, 17 pages.

"Summary of email discussion [93bis#23][NR] Deployment scenarios," 3GPP TSG-RAN WG2 #94, May 2016, R2-164306, Revision of R2-163399, NTT DOCOMO, Inc., Nanjing, China, 18 pages.

"3GPP TDocs (written contributions) at meeting," Meeting: R2-94, May 2016, Nanjing, China, 38 pages. http://www.3gpp.org/DynaReport/TDocExMtg—R2-94-31668.htm.

"RAN2 Impacts in HF-NR," 3GPP TSG-RAN WG2 #94, May 2016, R2-163879, MediaTek Inc., Nanjing, China, 5 pages.

"Beam level management <-> Cell level mobility," 3GPP TSG-RAN WG2 Meeting #93bis, Apr. 2016, R2-162210, Samsung, Dubrovnik, Croatia, 4 pages.

"Cell concept in NR," 3GPP TSG RAN WG2 Meeting #94, May 2016, R2-163471, CATT, Nanjing, China, 4 pages.

"General considerations on LTE-NR tight interworking," 3GPP TSG-RAN WG2 Meeting #94, May 2016, R2-164270, Huawei, HiSilicon, Nanjing, China, 3 pages.

"RAN2 aspects of high frequency New RAT," 3GPP TSG-RAN WG2 Meeting #93bis, Apr. 2016, R2-162251, Samsung, Dubrovnik, Croatia, 8 pages.

"Discussion on Beam Measurement and Tracking for 5G New Radio Interface in mmWave Frequency Bands," 3GPP TSG RAN WG2 #93bis, Apr. 2016, R2-162226, Samsung, Dubrovnik, Croatia, 5 pages.

"Mobility Supporting for HF-NR," 3GPP TSG-RAN WG2 #94, May 2016, R2-163484, MediaTek Inc., Nanjing, China, 6 pages.

"Evolved Universal Terrestrial Radio Access (E-UTRA) and Evolved Universal Terrestrial Radio Access Network (E-UTRAN)," 3rd Generation Partnership Project, Technical Specification Group Radio Access Network, Overall description, 3GPP TS 36.300, Mar. 2016, V13.3.0, 295 pages.

"Radio Resource Control (RRC)—Protocol specification," 3rd Generation Partnership Project, Technical Specification Group Radio Access Network, Evolved Universal Terrestrial Radio Access (E-UTRA), 3GPP TS 36.331, Mar. 2016, V13.1.0, 177 pages.

"User Equipment (UE) procedures in idle mode," 3rd Generation Partnership Project, Technical Specification Group Radio Access Network, Evolved Universal Terrestrial Radio Access (E-UTRA), 3GPP TS 36.304, Mar. 2016, V13.1.0, 43 pages.

Ericsson, "Si: Study on Latency reduction techniques for LTE," 3GPP TSG RAN Meeting #67, Mar. 2015, Rp-150465, Shanghai, China, 8 pages.

"Physical Layer Procedures," 3rd Generation Partnership Project, Technical Specification Group Radio Access network, Evolved Universal Terrestrial Radio Access (E-UTRA), 3GPP TS 36.213, Mar. 2016, V13.1.1, 361 pages.

"Physical Channels and Modulation," 3rd Generation Partnership Project, Technical Specification Group Radio Access network, Evolved Universal Terrestrial Radio Access (E-UTRA), 3GPP TS 36.211, Mar. 2016, V13.1.0, 155 pages.

"Multiplexing and Channel Coding," 3rd Generation Partnership Project, Technical Specification Group Radio Access network, Evolved Universal Terrestrial Radio Access (E-UTRA), 3GPP TS 36.212, Mar. 2016, V13.1.0, 129 pages.

"DL Channel Design for Shortened TTI", 3GPP TSG RAN WG1 #84bis, Apr. 2016, R1-163068, Qualcomm Incorporated, Busan, Korea, 7 pages.

* cited by examiner

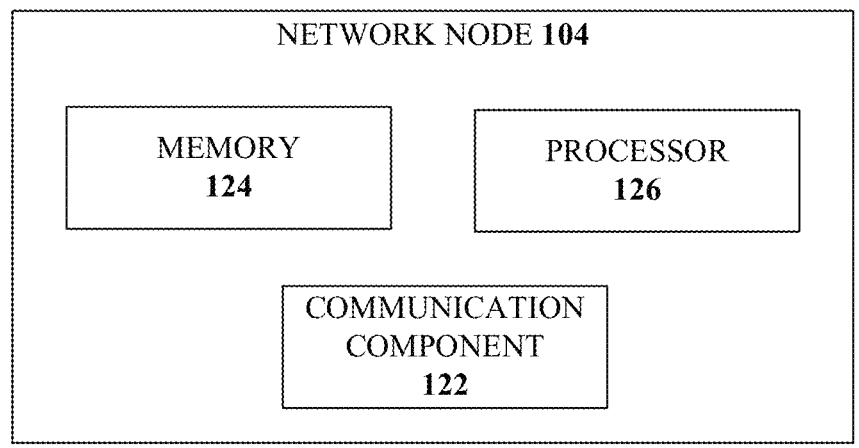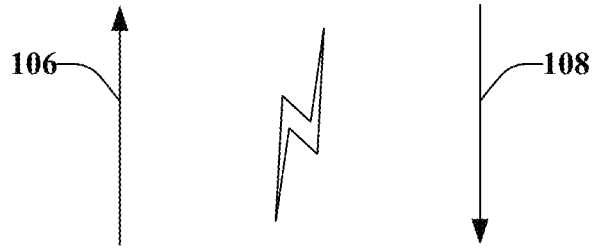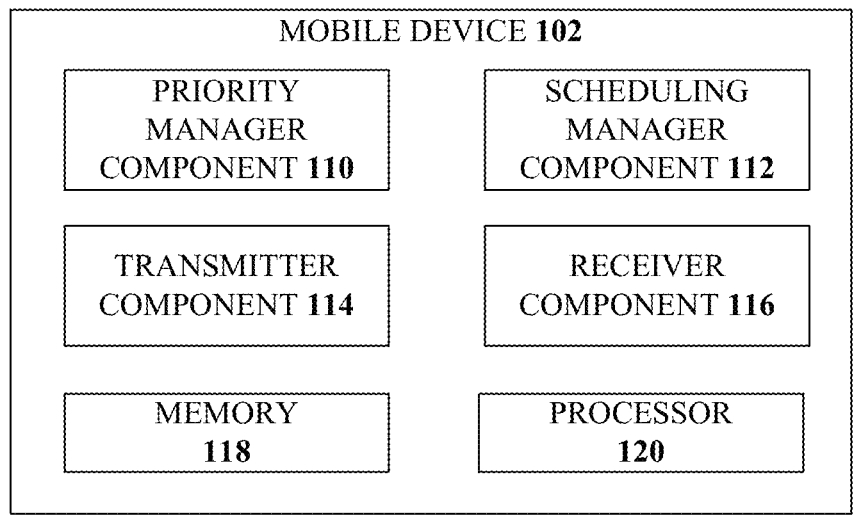
FIG. 1

UPLINK TRANSMISSION IN SHORTENED TRANSMISSION TIME INTERVALS IN A WIRELESS COMMUNICATION SYSTEM

CROSS-REFERENCE TO RELATED APPLICATIONS

This application claims the benefit of U.S. Provisional Application Ser. No. 62/335,541, filed May 12, 2016, and entitled "METHOD AND APPARATUS FOR IMPROVING UPLINK TRANSMISSION IN SHORTENED TTIs IN A WIRELESS COMMUNICATION SYSTEM," the entirety of which is expressly incorporated herein by reference.

TECHNICAL FIELD

The subject disclosure relates generally to communications systems, and for example, to facilitate uplink transmission in shortened transmission time intervals in a wireless communications system.

BACKGROUND

As wireless communications systems evolve, new demands are being placed on the networks, including an expectation of fast access and uninterrupted services. Packet data latency is one metric for performance evaluation of wireless communications systems. Thus, reducing packet data latency can improve the communications systems performance.

BRIEF DESCRIPTION OF THE DRAWINGS

Various non-limiting embodiments are further described with reference to the accompanying drawings in which:

FIG. 1 illustrates an example, non-limiting communications system for providing uplink transmissions in shortened transmission time intervals (TTIs) in a wireless communications system in accordance with one or more embodiments described herein;

DETAILED DESCRIPTION

Figure 2:
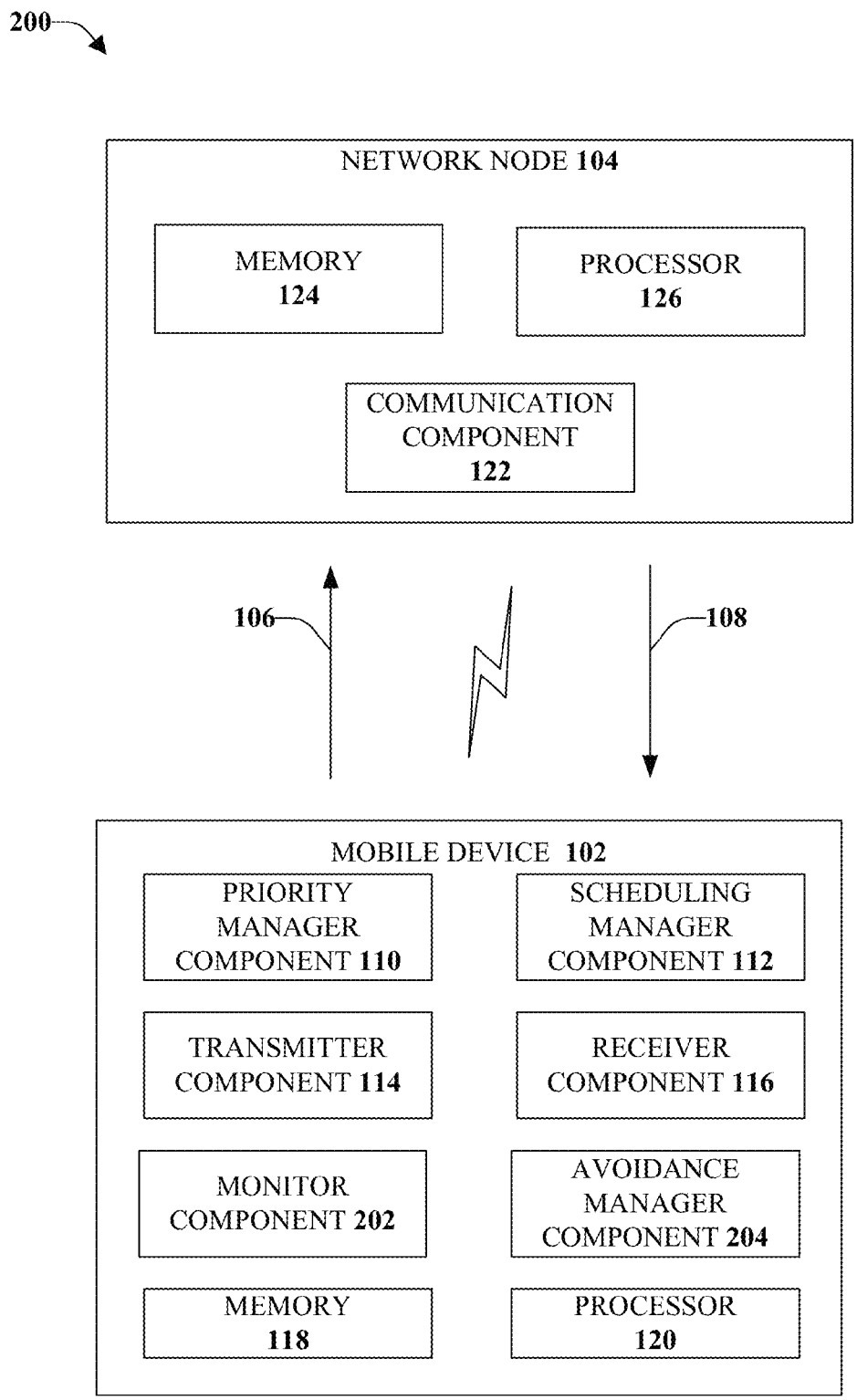
FIG. 2 illustrates an example, non-limiting communications system for UL grant scheduling avoidance to mitigate overlapping symbols in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Discussed herein are various aspects that provide improved uplink transmissions in shortened Transmission Time Intervals (TTIs) in a wireless communications system. Packet data latency is a metric for performance evaluation and, therefore, reducing packet data latency can improve the wireless communications network performance.

In an embodiment, described herein is a method that can comprise determining, by a device comprising a processor, a first priority level of a first uplink data transmission based on first downlink control information related to scheduling the first uplink data transmission via a first transmission time interval. The method can also comprise determining, by the device, a second priority level of a second uplink data transmission based on second downlink control information related to scheduling the second uplink data transmission via a second transmission time interval. The second uplink data transmission overlaps at least a symbol with the first uplink data transmission. The method can also comprise transmitting, by the device, the first uplink data transmission or the second uplink data transmission based on a prioritization determined based on the first priority level and the second priority level. The prioritization can include a first length of the first transmission time interval and a second length of the second transmission time interval.

According to another embodiment, described herein is a method that can comprise receiving, by a device comprising a processor, a first downlink control information related to scheduling a first uplink data transmission via a first transmission time interval. The method can also comprise receiving, by the device, a second downlink control information related to scheduling a second uplink data transmission via a second transmission time interval, wherein the second uplink data transmission overlaps at least a symbol with the first uplink data transmission. Further, the method can comprise transmitting, by the device, the first uplink data transmission or the second uplink data transmission based on a prioritization determined based on a first length of the first transmission time interval and a second length of the second transmission time interval.

In another embodiment, described herein is a method that can comprise receiving, by a mobile device comprising a processor, a first scheduling of a first uplink data transmission via a first transmission time interval based on a first downlink control information. The method can also comprise receiving, by the mobile device, a second scheduling of a second uplink data transmission via a second transmission time interval based on a second downlink control information. The second uplink data transmission can overlap at least a symbol with the first uplink data transmission. The method can also comprise transmitting, by the mobile device, the second uplink data transmission. The second uplink data transmission can override a portion of the first uplink data transmission.

According to another embodiment, a machine-readable storage medium can comprise executable instructions that, when executed by a processor, facilitate performance of operations. The operations can include determining a first priority level of a first uplink data transmission based on first downlink control information related to scheduling the first uplink data transmission via a first transmission time interval. The operations can also comprise determining a second priority level of a second uplink data transmission based on second downlink control information related to scheduling the second uplink data transmission via a second transmission time interval. The second uplink data transmission can overlap at least a symbol with the first uplink data transmission. Further, the operations can comprise transmitting the first uplink data transmission or the second uplink data transmission based on a prioritization determined based on the first priority level and the second priority level. The prioritization can include a first length of the first transmission time interval and a second length of the second transmission time interval.

According to an example, the operations can comprise transmitting the second uplink data transmission to override a portion of the first uplink data transmission. Further to this example, the operations can comprise transmitting a third uplink data transmission in an non-overlapped symbol of the portion of the first uplink data transmission that is overridden by the second uplink data transmission.

Referring initially to FIG. 1 illustrated is an example, non-limiting communications system 100 for providing uplink transmissions in shortened transmission time intervals (TTIs) in a wireless communications system in accordance with one or more embodiments described herein. As illustrated, a user equipment or mobile device 102 (e.g., mobile device or other terminology) can be in communication with a network node 104 (e.g., an eNodeB, eNB, or other terminology). Further, the mobile device 102 and/or the network node 104 can be in communication with other mobile devices (not shown) and/or other network nodes (not shown). A "link" is a communications channel that connects two or more devices or nodes. An uplink (UL 106) refers to a link used for transmission of signals from the mobile device 102 to the network node 104. A downlink (DL 108) refers to the link used for transmission of signals from the network node 104 to the mobile device 102. It is noted that although various aspects are discussed with respect to a single mobile device and a single network node, the various aspects discussed herein can be applied to one or more mobile devices and/or one or more network nodes.

The mobile device 102 can include a priority manager component 110, a scheduling manager component 112, a transmitter component 114, and a receiver component 116. Although illustrated and described with respect to separate components, the transmitter component 114 and the receiver component 116 can be a single transmitter/receiver configured to transmit to and/or receive data to/from the network node 104, other network nodes, and/or other Mobile devices. Through the transmitter component 114 and the receiver component 116, the mobile device 102 can concurrently transmit and receive data, the mobile device 102 can transmit and receive data at different times, or combinations thereof.

The priority manager component 110 can be configured to prioritize two or more UL data transmissions that are scheduled on, or overlap, at least a symbol of a TTI. For example, the mobile device 102 can be configured to transmit (e.g., via the transmitter component 114) a first UL data transmission via a first TTI, a second UL data transmission via a second TTI, and subsequent UL data transmissions via subsequent TTIs.

During one or more data transmissions, the second UL data transmission can overlap on at least one symbol with the first UL data transmission. Based on an indication of the at least one overlapping symbol, the priority manager component 110 can determine which data transmission has a higher priority and, based on this determination, the scheduling manager component 112 can facilitate a scheduling of the first UL data transmission and the second UL data transmission.

According to an implementation, the scheduling manager component 112 can schedule the first UL data transmission according to a first priority level determined based on first DL control information (e.g., received by the receiver component 116). Further, the scheduling manager component 112 can schedule the second UL data transmission according to a second priority level determined based on second DL control information (e.g., received by the receiver component 116).

For example, the priority manager component 110 can determine the second UL data transmission has a higher priority than the first UL transmission and, therefore, the scheduling manager component 112 can determine the scheduling of the second UL data transmission should override the scheduling of the first UL data transmission. Alternatively, if the priority manager component 110 determines the first UL data transmission has a higher priority than the second UL data transmission, the scheduling manager component 112 can schedule the first UL data transmission to override the schedule of the second UL data transmission.

According to an implementation, the priority manager component 110 can determine the respective priorities based on a first TTI length of the first UL data transmission and a second TTI length of the second UL data transmission. Further to this implementation, the scheduling manager component 112 can schedule the UL data transmission with the longer TTI length before the transmission of the UL data transmission with the shorted TTI length is scheduled. However, according to some implementations, the scheduling manager component 112 can schedule the UL data transmission with the short TTI length before the transmission of the UL data transmission with the longer TTI length is scheduled. Further details related to controlling overlapping of multiple UL data transmissions for the mobile device 102 in TTI shortening will be described in further detail with respect to the following figures.

The mobile device 102 can also include a memory 118 operatively coupled to a processor 120. The memory 118 can store protocols associated with UL transmission in shortened TTIs as discussed herein. Further, the memory 118 can facilitate action to control communication between the mobile device 102 and the network node 104, such that the non-limiting communications system 100 can employ stored protocols and/or algorithms to achieve improved communications in a wireless network as described herein.

According to some implementations, the mobile device 102 can include a control circuit and the processor 120 and the memory 118 can be installed on the control circuit. Further, the processor 120 can be configured to execute a program code stored in the memory 118 to perform the various aspects discussed herein.

The network node 104 can include a communication component 122 that can be a transmitter/receiver configured to transmit to and/or receive data from the mobile device 102, other network nodes, and/or other mobile devices. Through the communication component 122, the network node 104 can concurrently transmit and receive data, the network node 104 can transmit and receive data at different times, or combinations thereof.

The network node 104 can also comprise a memory 124 operatively coupled to a processor 126. The memory 124 can store protocols associated with UL transmission in shortened TTIs as discussed herein. Further, the memory 124 can facilitate action to control communication between the network node 104 and the mobile device 102, such that the non-limiting communications system 100 can employ stored protocols and/or algorithms to achieve improved communications in a wireless network as described herein.

FIG. 2 illustrates an example, non-limiting communications system 200 for UL grant scheduling avoidance to mitigate overlapping symbols in accordance with one or more embodiments described herein. Repetitive description of like elements employed in other embodiments described herein is omitted for sake of brevity. The non-limiting communications system 200 can comprise one or more of the components and/or functionality of non-limiting communications system 100, and vice versa.

For TTI shortening, the mobile device 102 can be dynamically (e.g., with a subframe to subframe granularity) scheduled with legacy TTI Physical Uplink Shared Channel (PUSCH) and/or shortened PUSCH (sPUSCH). The term "sPUSCH" refers to a PUSCH carrying data in a short UL TTI. Further, the mobile device 102 can be dynamically (e.g., with a subframe to subframe granularity) scheduled with legacy TTI Physical Downlink Shared Channel (PDSCH) and/or shortened PDSCH (sPDSCH). The term "sPDSCH" refers to a PDSCH carrying data in a short TTI. The short TTI, denoted as "sTTI" herein, can be configured via higher layer.

Each sTTI on the DL may contain a shortened Physical Downlink Control Channel (sPDCCH) decoding candidates. The sPDCCH can be designed for at least scheduling sPUSCH transmissions and/or sPDSCH transmissions. If a sPUSCH transmission is scheduled, the processing time for preparing UL data transmission upon UL grant reception at the mobile device 102 may be reduced. However, the processing time for legacy PUSCH may not be reduced, according to some implementations. Thus, it is possible that the UL data transmission with different TTI lengths may be scheduled to be transmitted in overlapped symbols.

As illustrated, the mobile device 102 can include a monitor component 202 that can monitor incoming UL grant scheduling (e.g., PDCCH and/or sPDCCH). When a first UL grant scheduling arrives, the monitor component 202 can determine when a second (or subsequent) UL grant scheduling arrives. During a pendency of the first UL grant scheduling, an avoidance manager component 204 can selectively avoid the second (or subsequent) UL grant scheduling after a first UL grant scheduling is received.

Figure 3:
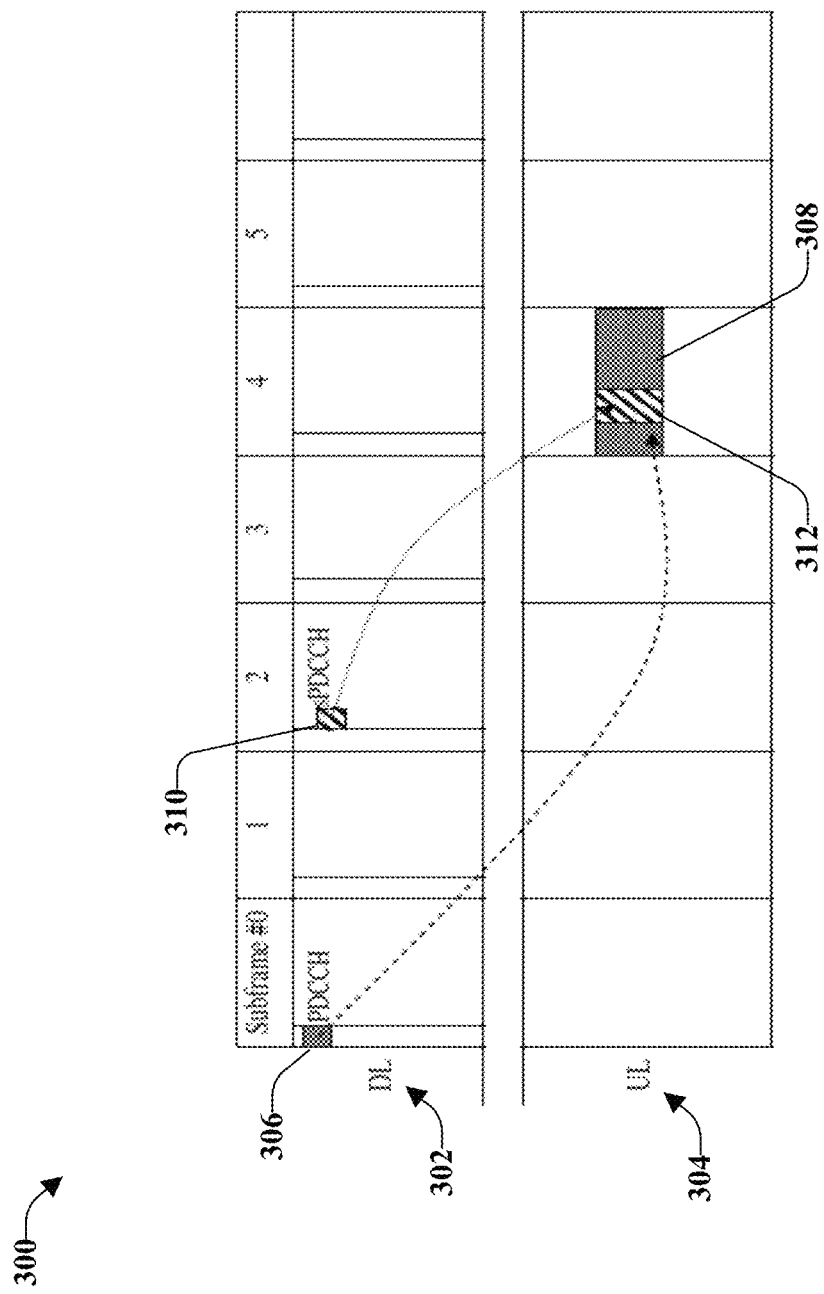
FIG. 3 illustrates a schematic representation of frame structures for data transmissions in accordance with one or more embodiments described herein.

For example, FIG. 3 illustrates a schematic representation 300 of frame structures for data transmissions in accordance with one or more embodiments described herein. Illustrated are subframes of a DL 302 and subframes of an UL 304. A first DL transmission that includes a PDCCH 306 can be received at the mobile device 102. The PDCCH 306 can schedule a first UL data transmission 308. As illustrated, the first UL data transmission 308 can occupy an entire subframe (e.g., subframe 4 in this example). Further, a second DL transmission that includes a sPDCCH 310 can be received by the mobile device 102. The sPDCCH 310 can schedule a second UL data transmission 312. As illustrated, the second UL data transmission 312 overlaps symbols of the first UL data transmission 308.

According to some embodiments, power issues can be induced by the overlapping symbols. Further, it is also possible that the UL data transmission with different TTI lengths may be scheduled to be transmitted in overlapped frequency resources. Thus, the various aspects provided herein can assist to mitigate or avoid possible interference between UL data transmission with different TTI lengths.

With continuing reference to FIG. 2, according to an implementation, to manage the possible overlapping, avoidance of a later UL grant scheduling can be facilitated by the avoidance manager component 204. In this implementation, when the mobile device 102 (e.g., the monitor component 202) detects a UL grant scheduling a first UL data transmission, the mobile device 102 (e.g., the avoidance manager component 204) can skip monitoring some PDCCH/sPDCCH candidates. The candidates skipped can include candidates that might schedule a second UL data transmission overlapped on some symbol(s) with the first UL data transmission.

In some implementations, the monitor component 202 can continue to monitor the PDCCH/sPDCCH candidates that can schedule a second UL data transmission overlapped on some symbol(s) with the first UL data transmission. However, the avoidance manager component 204 can selectively ignore the scheduling of the second UL data transmission if any PDCCH/sPDCCH scheduling the second UL data transmission overlapped on some symbol(s) with the first UL data transmission is detected.

A reason for continuing to monitor the PDCCH/sPDCCH candidates by the monitor component 202 is to consider possible scheduling of DL assignment since the DL assignment and UL grant may have similar PDCCH/sPDCCH design (e.g. the same downlink control information size with one field to indicate DL assignment or UL grant). Thus, any later UL grant scheduling a second UL data transmission which overlaps in some symbols with a first UL data transmission scheduled by a previous UL grant can be ignored by the avoidance manager component 204.

The first UL data transmission and the second UL data transmission can be on UL data channel in different TTI lengths. For example, the first UL data transmission can be on PUSCH and the second UL data transmission can be on sPUSCH. In another example, the first UL data transmission can be on sPUSCH and the second UL data transmission can be on PUSCH. In a further example, the first UL data transmission can be on sPUSCH in a first short TTI, and the second UL data transmission can be on sPUSCH in a second short TTI. Additionally or alternatively, the second UL data transmission and the first UL data transmission can overlap in some frequency resources.

Figure 4:
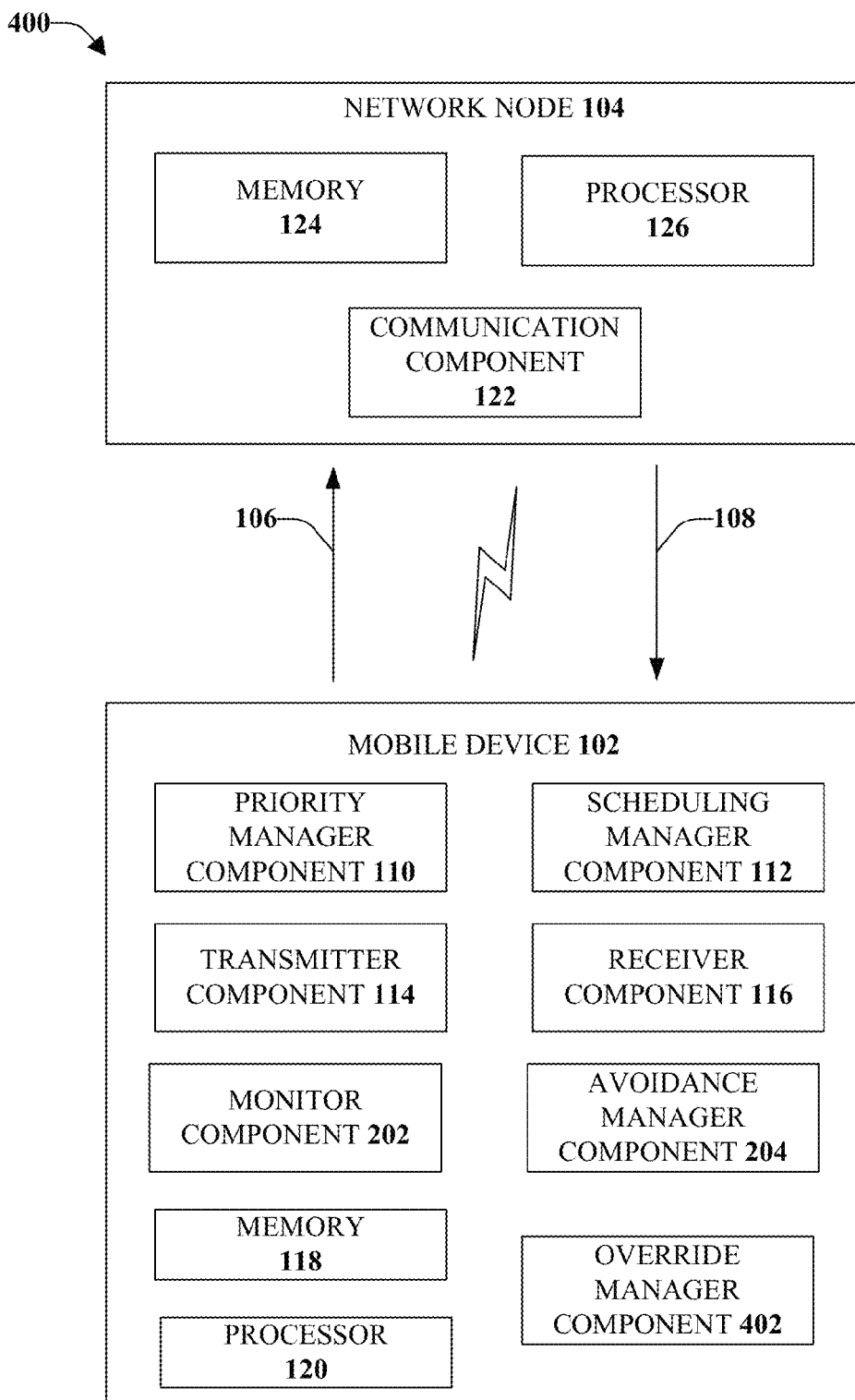
FIG. 4 illustrates an example, non-limiting communications system for utilizing later UL grant scheduling to mitigate overlapping symbols in accordance with one or more embodiments described herein.

FIG. 4 illustrates an example, non-limiting communications system 400 for utilizing later UL grant scheduling to mitigate overlapping symbols in accordance with one or more embodiments described herein. Repetitive description of like elements employed in other embodiments described herein is omitted for sake of brevity. The non-limiting communications system 400 can comprise one or more of the components and/or functionality of non-limiting communications system 100, and/or non-limiting communications system 200, and vice versa.

To manage the possible overlapping, later UL grant scheduling can be facilitated by an override manager component 402. It can be beneficial for the network node (e.g., the eNB) to have more scheduling flexibility (e.g., scheduling coming urgent data via a later UL grant scheduling). When the monitor component 202 detects a UL grant scheduling a first UL data transmission, the monitor component 202 can continue to monitor the PDCCH/sPDCCH candidates which might schedule a second UL data transmission overlapped on some symbol(s) with the first UL data transmission. The first UL data transmission and the second UL data transmission may be on UL data channel in different TTI lengths. For example, the first UL data transmission can be on PUSCH and the second UL data transmission can be on sPUSCH. In another example, the first UL data transmission can be on sPUSCH and the second UL data transmission can be on PUSCH. In yet another example, the first UL data transmission can be on sPUSCH in a first short TTI, and the second UL data transmission can be on sPUSCH in a second short TTI. Additionally or alternatively, the second UL data transmission and first UL data transmission can overlap in some frequency resources.

If any PDCCH/sPDCCH scheduling the second UL data transmission is detected by the monitor component 202, the transmission priority between the scheduled second UL data transmission and the scheduled first UL data transmission could depend on the TTI length of the UL data channel. For example, the mobile device 102 can transmit sPUSCH instead of PUSCH. Alternatively, the mobile device 102 can transmit PUSCH instead of sPUSCH. Alternatively, the scheduling of the second UL data transmission can override the scheduling of the first UL data transmission as facilitated by the override manager component 402.

Further, if the UL grant scheduling the UL data transmission with longer TTI overrides the UL grant scheduling the UL data transmission with shorter TTI, the mobile device 102 can transmit the UL data transmission with the longer TTI. If the UL grant scheduling the UL data transmission with shorter TTI overrides the UL grant scheduling the UL data transmission with longer TTI, the mobile device 102 can transmit the UL data transmission with short TTI. The UL data transmission with shorter TTI may be fully overlapped in time domain with the UL data transmission with longer TTI. Moreover, it is possible that the UL data transmission with short TTI can be partially overlapped in time domain with the UL data transmission with longer TTI. As for the non-overlapped symbol(s) of the overridden UL data transmission, the mobile device does not transmit the overridden UL data transmission. Alternatively, the mobile device can transmit a third UL data transmission in the non-overlapped symbol(s) of the overridden UL data transmission. Alternatively, the mobile device can transmit a third UL data transmission in the non-overlapped symbol(s) of the overridden UL data transmission if the ratio of non-overlapped symbol(s) and overlapped symbol(s) of the overridden UL data transmission is larger than or equal to a threshold.

The third UL data transmission can be punctured from the overridden UL data transmission. Alternatively, the transmission parameters (e.g., Modulation and Coding Scheme (MCS), Hybrid Automatic Repeat Request (HARQ) process, Redundancy Version (RV), Transport Block Size (TBS), frequency resource allocation), of the third UL data transmission can be derived at least from the overridden UL data transmission. For example, the MCS of the third UL data transmission can be the same as the overridden UL data transmission. Alternatively, the MCS of the third UL data transmission can be derived from at least the MCS of the overridden UL data transmission and/or the ratio of non-overlapped symbol(s) and overlapped symbol(s) of the overridden UL data transmission. The HARQ process of the third UL data transmission can be the same as the overridden UL data transmission. Alternatively, the HARQ process of the third UL data transmission can be different from the first UL data transmission and the second UL data transmission. The RV of the third UL data transmission can be the same as the overridden UL data transmission. Alternatively, the RV of the third UL data transmission can be set to zero. The TBS of the third UL data transmission can be the same as the overridden UL data transmission. Alternatively, the TBS of the third UL data transmission can be derived at least from the number of the non-overlapped symbol(s) or the ratio of non-overlapped symbol(s) and overlapped symbol(s) of the overridden UL data transmission. The frequency resource allocation of the third UL data transmission can be the same as the overridden UL data transmission. Alternatively, the frequency resource allocation of the third UL data transmission can be determined from one of the frequency resource allocation of the first UL data transmission and the second UL data transmission. The determination might depend on the scheduled frequency resource size of the first UL data transmission and the second UL data transmission. For example, the frequency resource allocation of the third UL data transmission can be the same as the frequency resource allocation with larger scheduled frequency resource size between the first UL data transmission and the second UL data transmission. Alternatively, the frequency resource allocation of the third UL data transmission can be the same as the frequency resource allocation with smaller scheduled frequency resource size between the first UL data transmission and the second UL data transmission.

Figure 5:
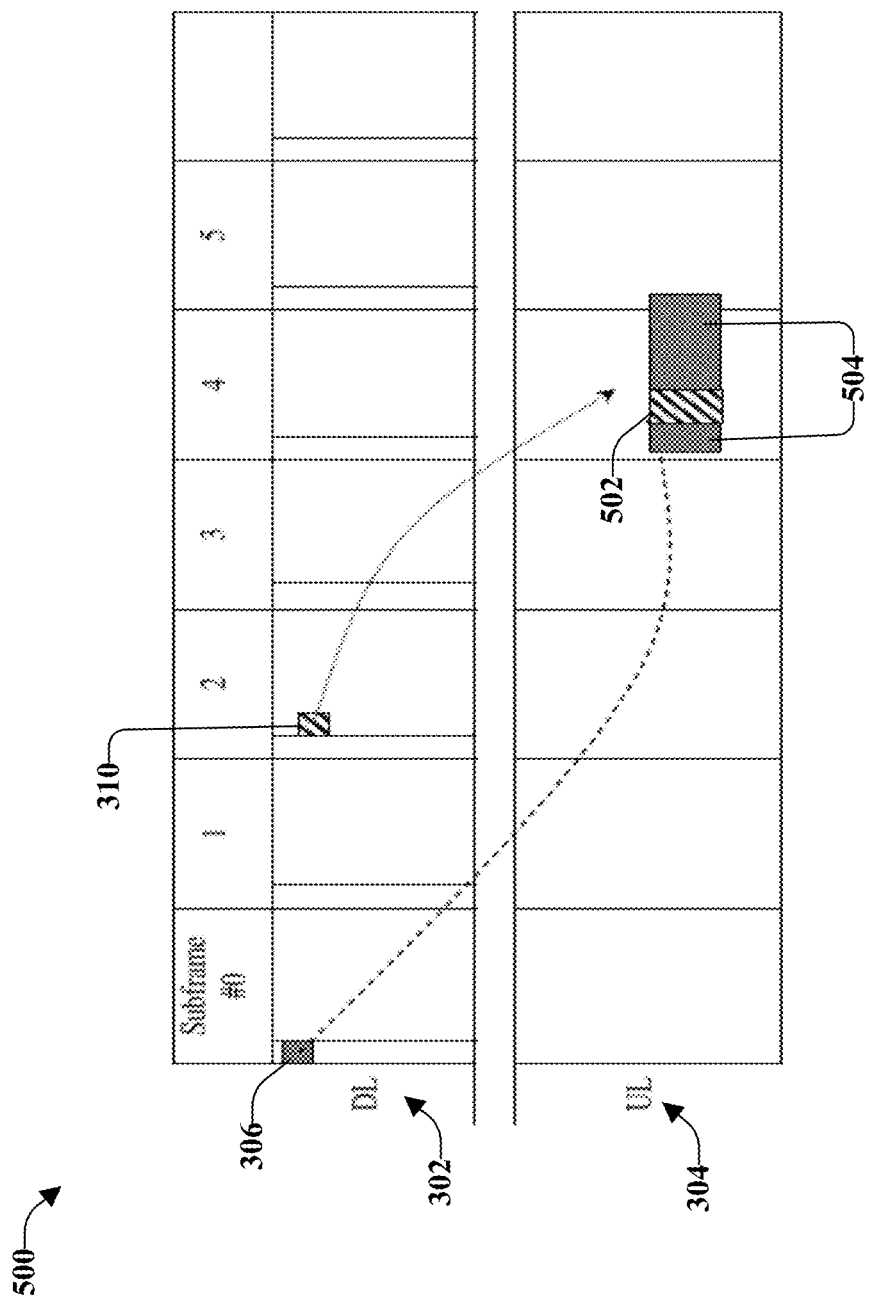
FIG. 5 illustrates an example, schematic representation of frame structures for data transmissions in accordance with one or more embodiments described herein.

FIG. 5 illustrates an example, schematic representation 500 of frame structures for data transmissions in accordance with one or more embodiments described herein. Repetitive description of like elements employed in other embodiments described herein is omitted for sake of brevity. A first UL data transmission can be similar to the UL data transmission 308 of FIG. 3, which occupies an entire subframe.

In the example of FIG. 5, a second UL data transmission 502 is transmitted by the mobile device 102 and a third UL data transmission 504 is transmitted by the mobile device 102. The first UL data transmission is the overridden UL data transmission. For example, the third UL data transmission 504 overrides the first UL data transmission.

Since the mobile device may miss any one of the later UL grant or the previous UL grant, the eNB has to consider mobile device misdetection. The eNB may try several decoding hypotheses, at least assuming both of the later UL grant or the previous UL grant are detected by mobile device or assuming one of the later UL grant or the previous UL grant is missed by UE. Furthermore, the eNB avoids allocating any UL data transmission to another mobile device on the non-overlapped resources between the first UL data transmission and the second UL data transmission for a UE.

Figure 6:
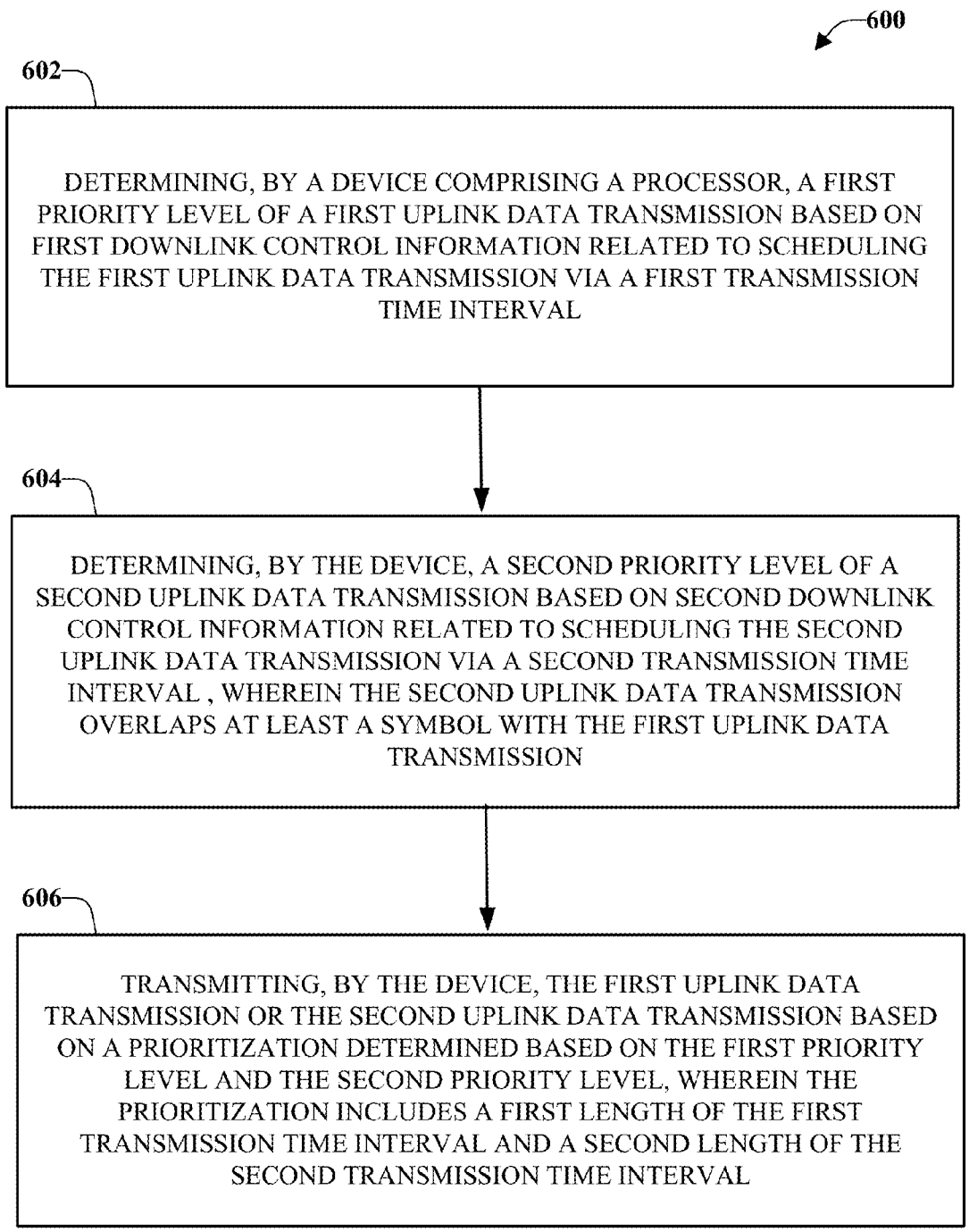
FIG. 6 illustrates an example, non-limiting method for uplink transmission in shortened transmission time intervals in accordance with one or more embodiments described herein.

FIG. 6 illustrates an example, non-limiting method 600 for uplink transmission in shortened TTIs in accordance with one or more embodiments described herein. At 602, a device comprising a processor can determine a first priority level of a first uplink data transmission based on first downlink control information related to scheduling the first uplink data transmission via a first TTI. At 604, the device can determine a second priority level of a second uplink data transmission based on second downlink control information related to scheduling the second uplink data transmission via a second TTI, wherein the second uplink data transmission overlaps at least a symbol with the first uplink data transmission.

Further, at 606, the device can transmit the first uplink data transmission or the second uplink data transmission based on a prioritization determined based on the first priority level and the second priority level, wherein the prioritization includes a first length of the first TTI and a second length of the second TTI. In an example, transmitting the first uplink data transmission or the second uplink data transmission comprises transmitting the first TTI for UL data transmission via the first TTI and transmitting the second TTI for UL data transmission via the second TTI.

According to some implementations, transmitting the first uplink data transmission or the second uplink data transmission can comprise transmitting the second uplink data transmission to override a scheduling of the first uplink data transmission based on a determination that the second priority level is prioritized before the first priority level.

According to another implementation, transmitting the first uplink data transmission or the second uplink data transmission can comprise transmitting the first uplink data transmission to override a scheduling of the second uplink data transmission based on a determination that the first priority level is prioritized before the second priority level.

In an implementation, the prioritization can be based on the first length and the second length. Further to this implementation, transmitting the first uplink data transmission or the second uplink data transmission can comprise transmitting the second uplink data transmission to override a scheduling of the first uplink data transmission based on a determination that the second length is shorter than the first length. In some implementations, the mobile device does not transmit the first uplink data transmission that is overridden by the second uplink data transmission.

In an alternative implementation, the prioritization can be based on the first length and the second length. Further to this alternative implementation, transmitting the first uplink data transmission or the second uplink data transmission can comprise transmitting the first uplink data transmission to override a scheduling of the second uplink data transmission based on a determination that the first length is shorter than the second length. In some implementations, the mobile device does not transmit the second uplink data transmission that is overridden by the first uplink data transmission.

In still another implementation, the prioritization can be based on the first length and the second length. Further to this implementation, transmitting the first uplink data transmission or the second uplink data transmission can comprise transmitting the second uplink data transmission to override a scheduling of the first uplink data transmission based on a determination that the second length is longer than the first length. In some implementations, the mobile device does not transmit the first uplink data transmission that is overridden by the second uplink data transmission.

According to yet another implementation, the prioritization can be based on the first length and the second length. Further to this implementation, transmitting the first uplink data transmission or the second uplink data transmission can comprise transmitting the first uplink data transmission to override a scheduling of the second uplink data transmission based on a determination that the first length is longer than the second length. In some implementations, the mobile device does not transmit the second uplink data transmission that is overridden by the first uplink data transmission.

Figure 7:
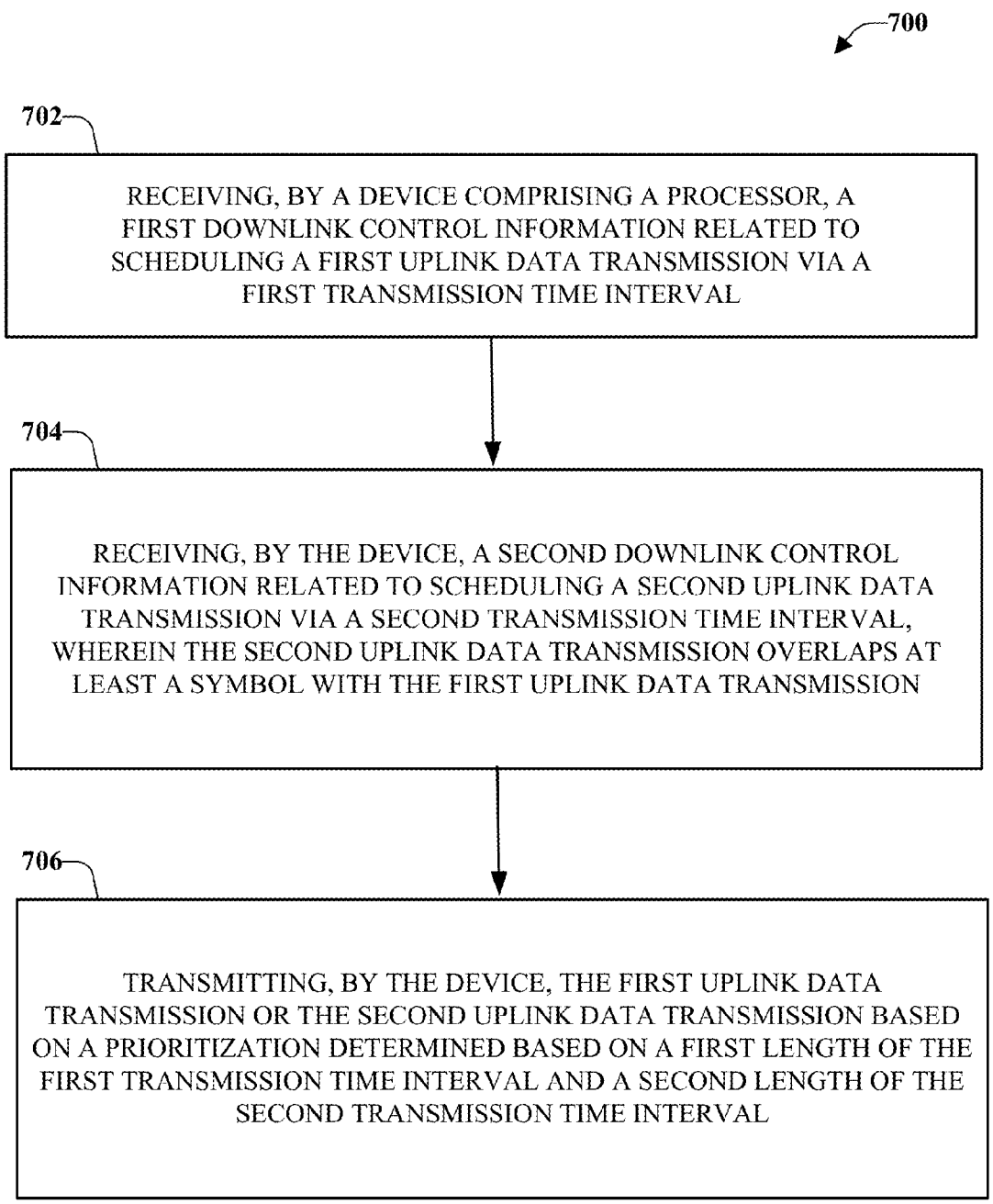
FIG. 7 illustrates an example, non-limiting method for uplink data transmission based on priority data in accordance with one or more embodiments described herein.

FIG. 7 illustrates an example, non-limiting method 700 for uplink data transmission based on priority data in accordance with one or more embodiments described herein. At 702, a device comprising a processor, can receive a first downlink control information related to scheduling a first uplink data transmission via a first transmission time interval. At 704, the device can receive a second downlink control information related to scheduling a second uplink data transmission via a second transmission time interval. The second uplink data transmission can overlap at least a symbol with the first uplink data transmission.

Further, at 706, the device can transmit the first uplink data transmission or the second uplink data transmission based on a prioritization determined based on a first length of the first transmission time interval and a second length of the second transmission time interval.

According to an implementation, the prioritization can be based on the first length and the second length. Further to this implementation, transmitting the first uplink data transmission or the second uplink data transmission can comprise transmitting the second uplink data transmission to override a scheduling of the first uplink data transmission based on a determination that the second length is shorter than the first length. In an implementation, the mobile device does not transmit the first uplink data transmission that is overridden by the second uplink data transmission.

In some implementations, the prioritization can be based on the first length and the second length. In these implementations, transmitting the first uplink data transmission or the second uplink data transmission comprises transmitting the first uplink data transmission to override a scheduling of the second uplink data transmission based on a determination that the first length is shorter than the second length. In an implementation, the mobile device does not transmit the second uplink data transmission that is overridden by the first uplink data transmission.

Figure 8:
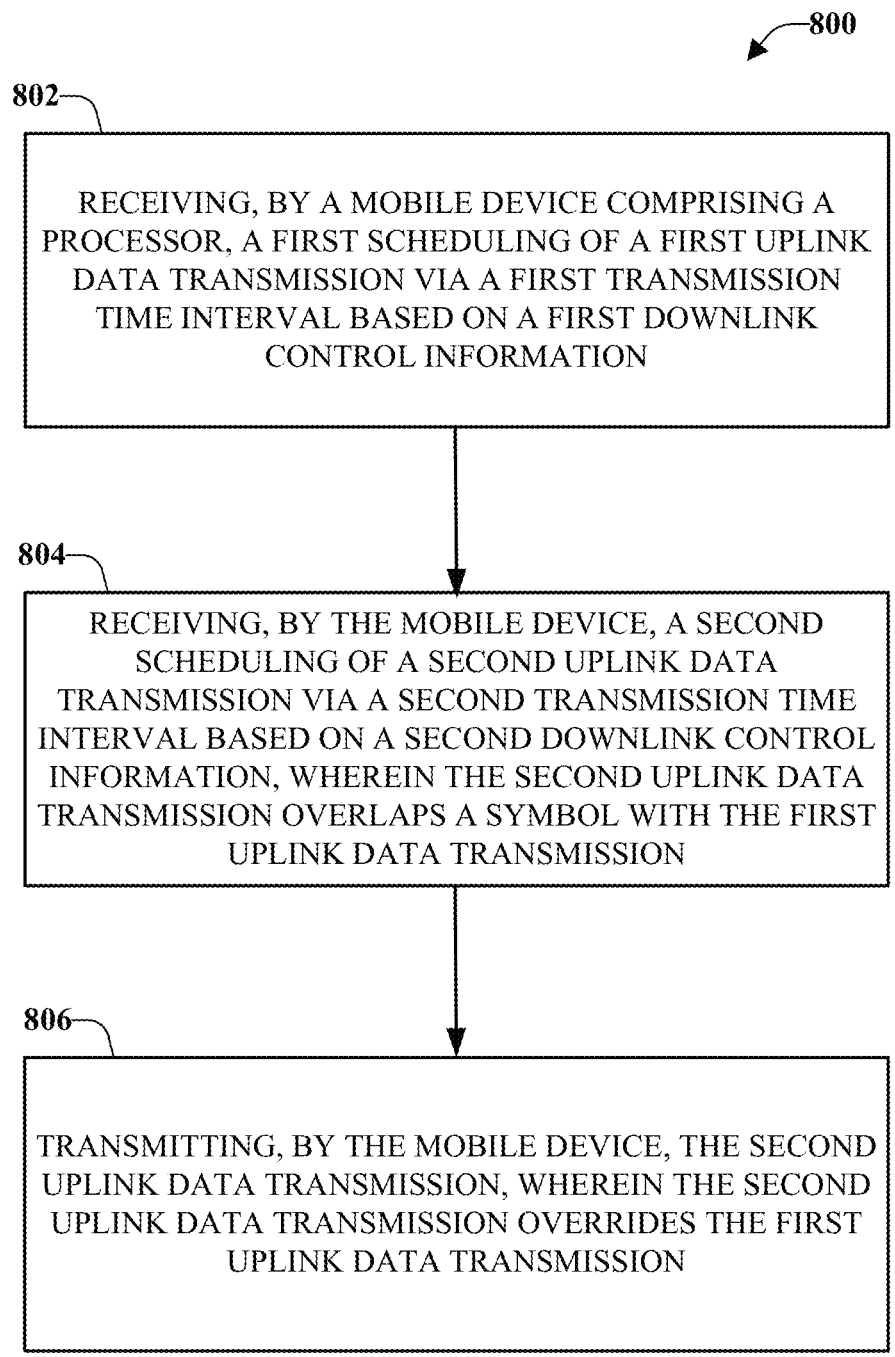
FIG. 8 illustrates another example, non-limiting method for uplink transmission in shortened transmission time intervals in accordance with one or more embodiments described herein.

FIG. 8 illustrates another example, non-limiting method 800 for uplink transmission in shortened TTIs in accordance with one or more embodiments described herein. At 802, a mobile device comprising a processor, can receive a first scheduling of a first uplink data transmission via a first transmission time interval based on a first downlink control information. At 804, the mobile device can receive a second scheduling of second uplink data transmission via a second transmission time interval based on a second downlink control information. The second uplink data transmission can overlap at least a symbol with the first uplink data transmission. In an example, the second downlink control information can be received after a receipt of the first downlink control information.

At 806, the mobile device can transmit the second uplink data transmission. The second uplink data transmission can override a portion of the first uplink data transmission. According to an implementation, the mobile device does not transmit the portion of the first uplink data transmission that is overridden by the second uplink data transmission.

According to an implementation, the method can include transmitting, by the mobile device, a third uplink data transmission in a non-overlapped symbol of the portion of the first uplink data transmission that is overridden by the second uplink data transmission. Further, to this implementation, the third uplink data transmission can be punctured from the portion of the first uplink data transmission that is overridden by the second uplink data transmission. Alternatively or additionally, a transmission parameter of the third uplink data transmission is derived from the first uplink data transmission that is overridden by the second uplink data transmission.

In some implementations, the first uplink data transmission can comprise a first modulation and coding scheme and the third uplink data transmission can comprise a second modulation and coding scheme, wherein the first modulation and coding scheme and the second modulation and coding scheme are a same modulation and coding scheme. In other implementations, the first uplink data transmission can comprise a first hybrid automatic repeat request process and the third uplink data transmission can comprise a second hybrid automatic repeat request process, wherein the first hybrid automatic repeat request process and the second hybrid automatic repeat request process are a same hybrid automatic repeat request process. In still another implementation, the first uplink data transmission comprises a first transport block size and the third uplink data transmission comprises a second transport block size, wherein the first transport block size and the second transport block size are a same transport block size.

Figure 9:
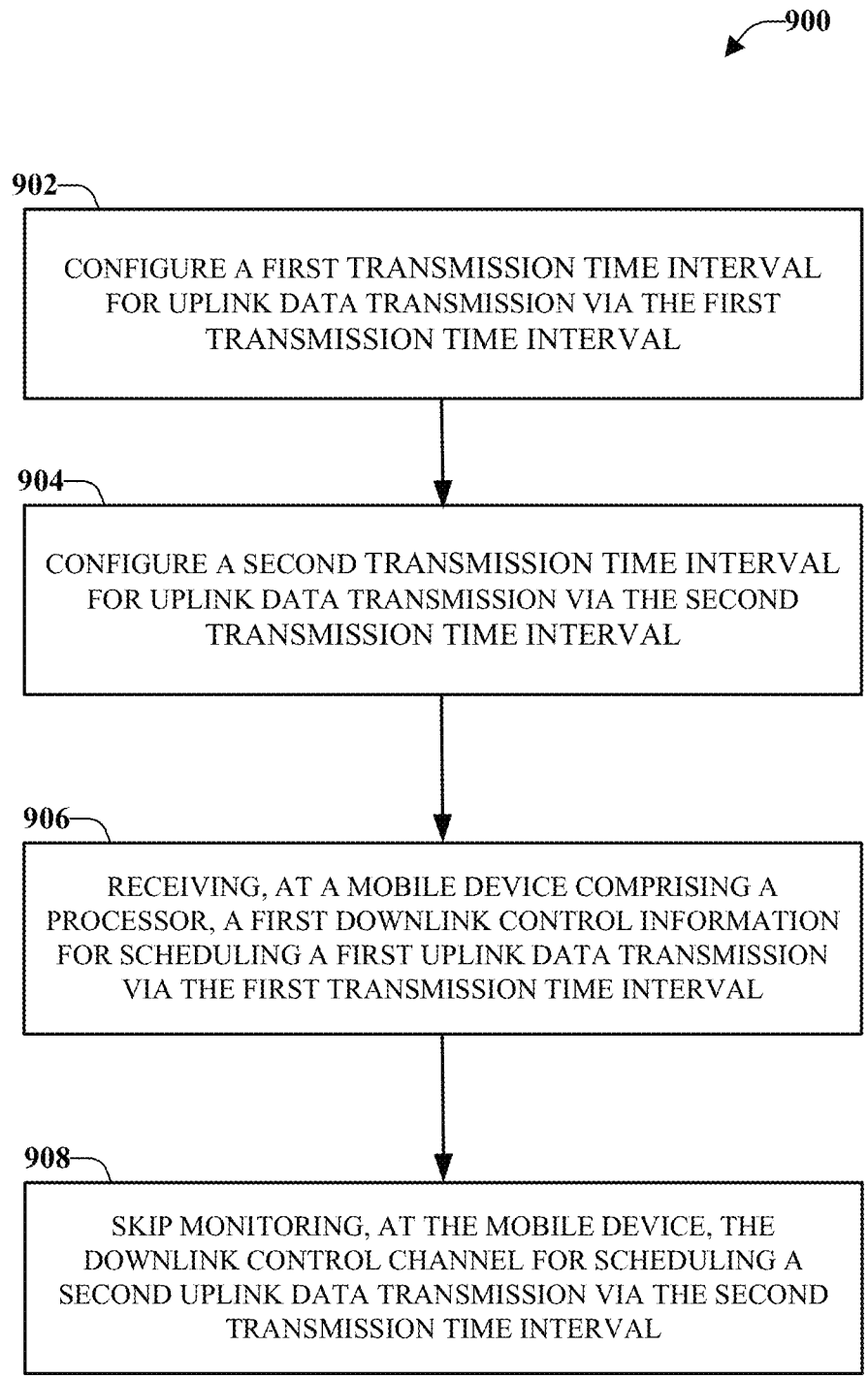
FIG. 9 illustrates an example, non-limiting method for a mobile device comprising a processor to skip monitoring a downlink control channel after a first downlink control information is received in accordance with one or more embodiments described herein.

FIG. 9 illustrates an example, non-limiting method 900 for a mobile device comprising a processor to skip monitoring a DL control channel after a first DL control information is received in accordance with one or more embodiments described herein. The method 900 starts at 902 when a first TTI for UL data transmission via the first TTI can be configured. A second TTI for UL data transmission via the second TTI can be configured at 904. At 906, the mobile device can receive a first DL control information for scheduling a first UL data transmission via the first TTI. Further, at 908, the mobile device can skip monitoring the DL control channel for scheduling a second UL data transmission via the second TTI. The scheduled second UL data transmission can overlap on some symbol(s) with the scheduled first UL data transmission.

Figure 10:
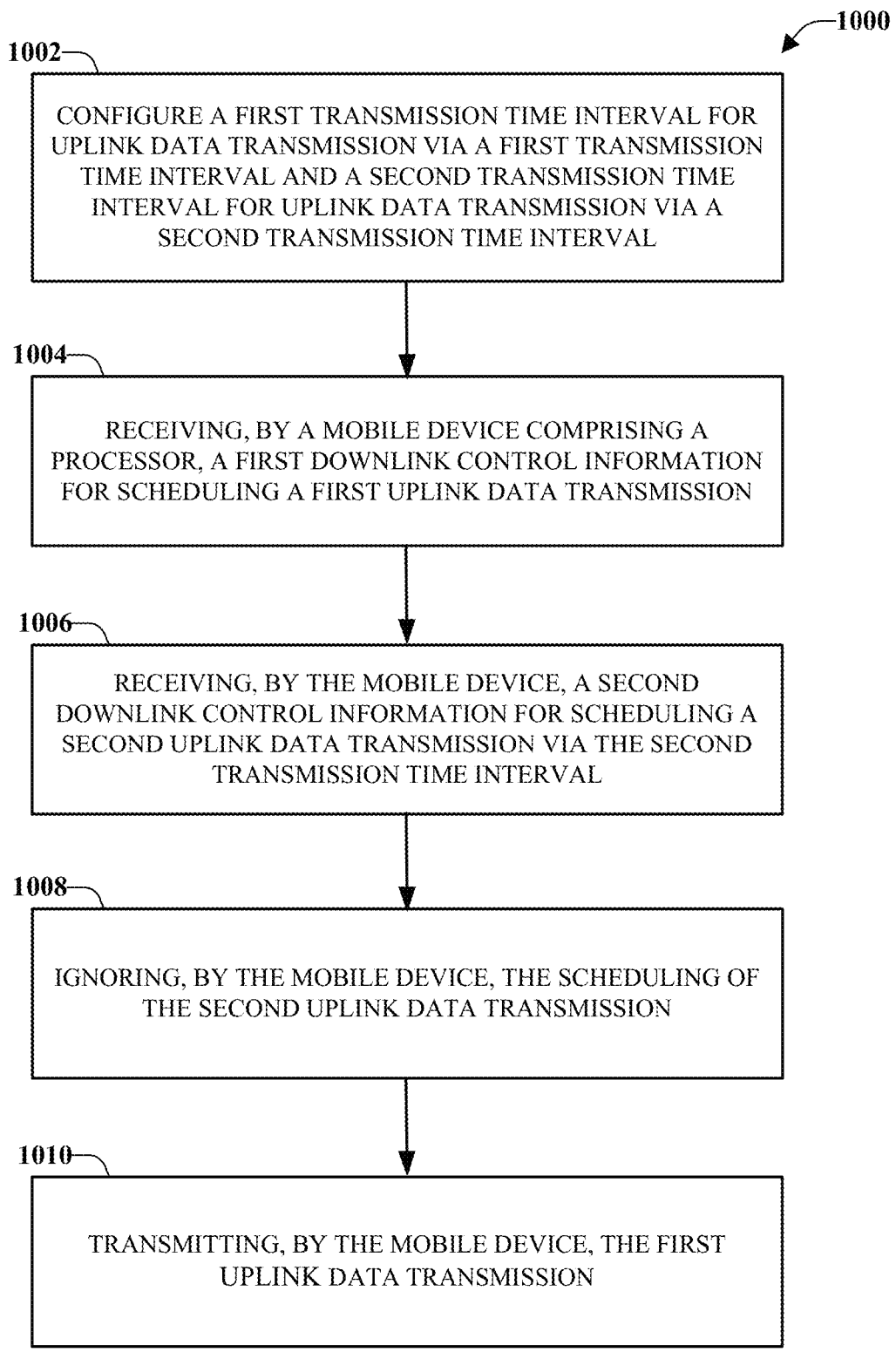
FIG. 10 illustrates an example, non-limiting method for a mobile device to ignore scheduling of a second uplink data transmission after receipt of a first uplink data transmission in accordance with one or more embodiments described herein.

FIG. 10 illustrates an example, non-limiting method 1000 for a mobile device to ignore scheduling of a second UL data transmission after receipt of a first UL data transmission in accordance with one or more embodiments described herein. At 1002, a first TTI for UL data transmission via a first TTI and a second TTI for UL data transmission via a second TTI are configured.

A first DL control information for scheduling a first UL data transmission is received by the mobile device at 1004. The mobile device receives, at 1006, a second DL control information for scheduling a second UL data transmission via the second TTI. The scheduled second UL data transmission overlaps on some symbol(s) with the scheduled first UL data transmission. Therefore, at 1008, the mobile device can ignore the scheduling of the second UL data transmission. Accordingly, at 1010, the mobile device can transmit the first UL data transmission.

Figure 11:
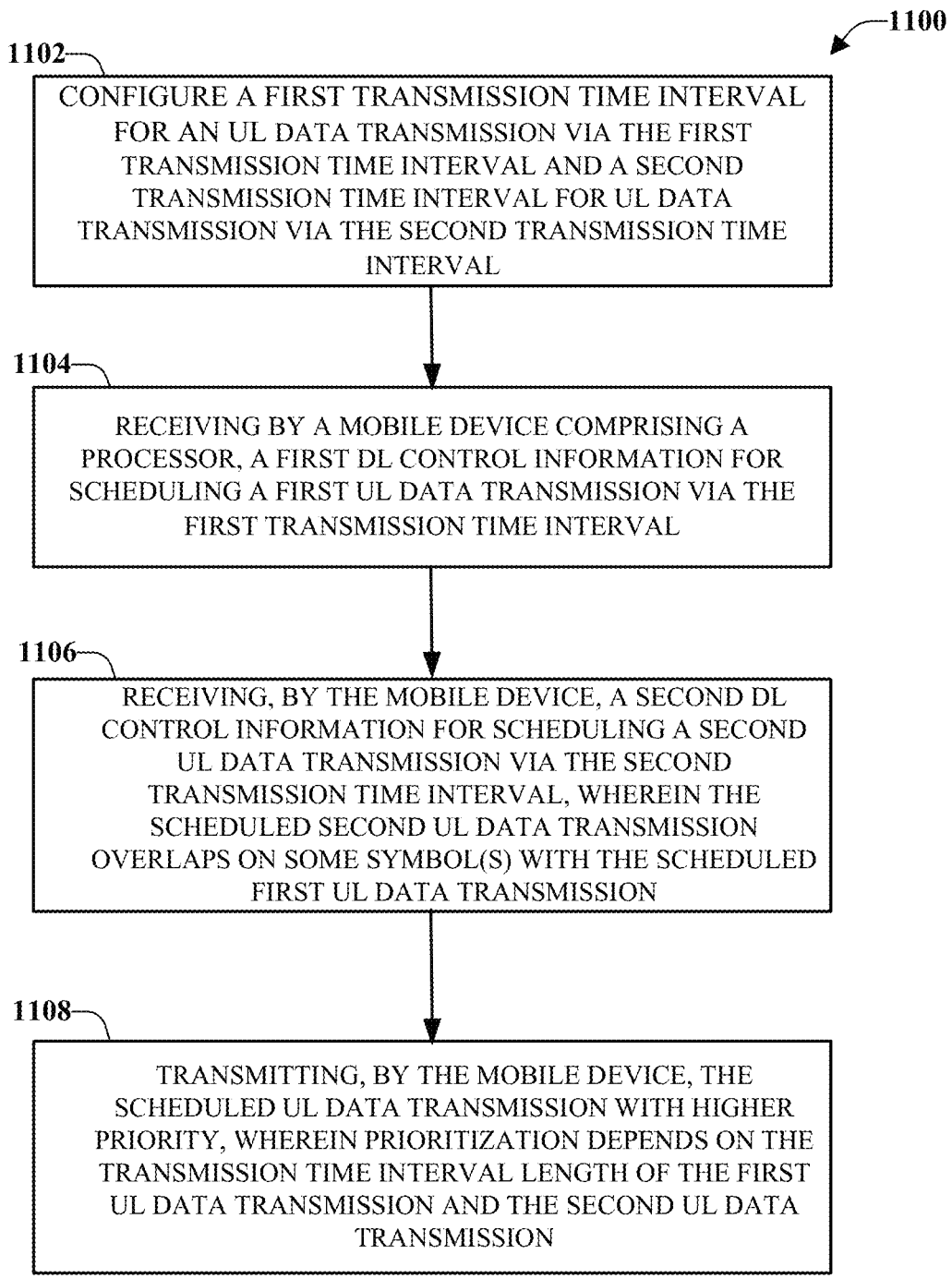
FIG. 11 illustrates an example, non-limiting method for a mobile device comprising a processor for improved uplink transmission in shortened transmission time intervals in accordance with one or more embodiments described herein.

FIG. 11 illustrates an example, non-limiting method 1100 for a mobile device comprising a processor for improved uplink transmission in shortened transmission time intervals in accordance with one or more embodiments described herein. The method 1100 starts at 1102 when a first TTI for an UL data transmission via the first TTI and a second TTI for UL data transmission via the second TTI are configured.

A first DL control information for scheduling a first UL data transmission via the first TTI is received, by a mobile device comprising a processor, at 1104. A second DL control information for scheduling a second UL data transmission via the second TTI is received by the mobile device at 1106. The scheduled second UL data transmission overlaps on some symbol(s) with the scheduled first UL data transmission. Thus, at 1108, the mobile device transmits the scheduled UL data transmission with higher priority. The prioritization depends on the TTI length of the first UL data transmission and the second UL data transmission.

According to an implementation, the scheduling of UL data transmission with higher priority overrides the scheduling of the UL data transmission with lower priority. In some implementations, the mobile device can transmit the scheduled UL data transmission with longer TTI length. In accordance with some implementations, the scheduling of the UL data transmission with longer TTI length overrides the scheduling of the UL data transmission with a shorter TTI length. In an implementation, the mobile device can transmit the scheduled UL data transmission with shorter TTI length. In another implementation, the scheduling of the UL data transmission with shorter TTI length can override the scheduling of the UL data transmission with longer TTI length.

Figure 12:
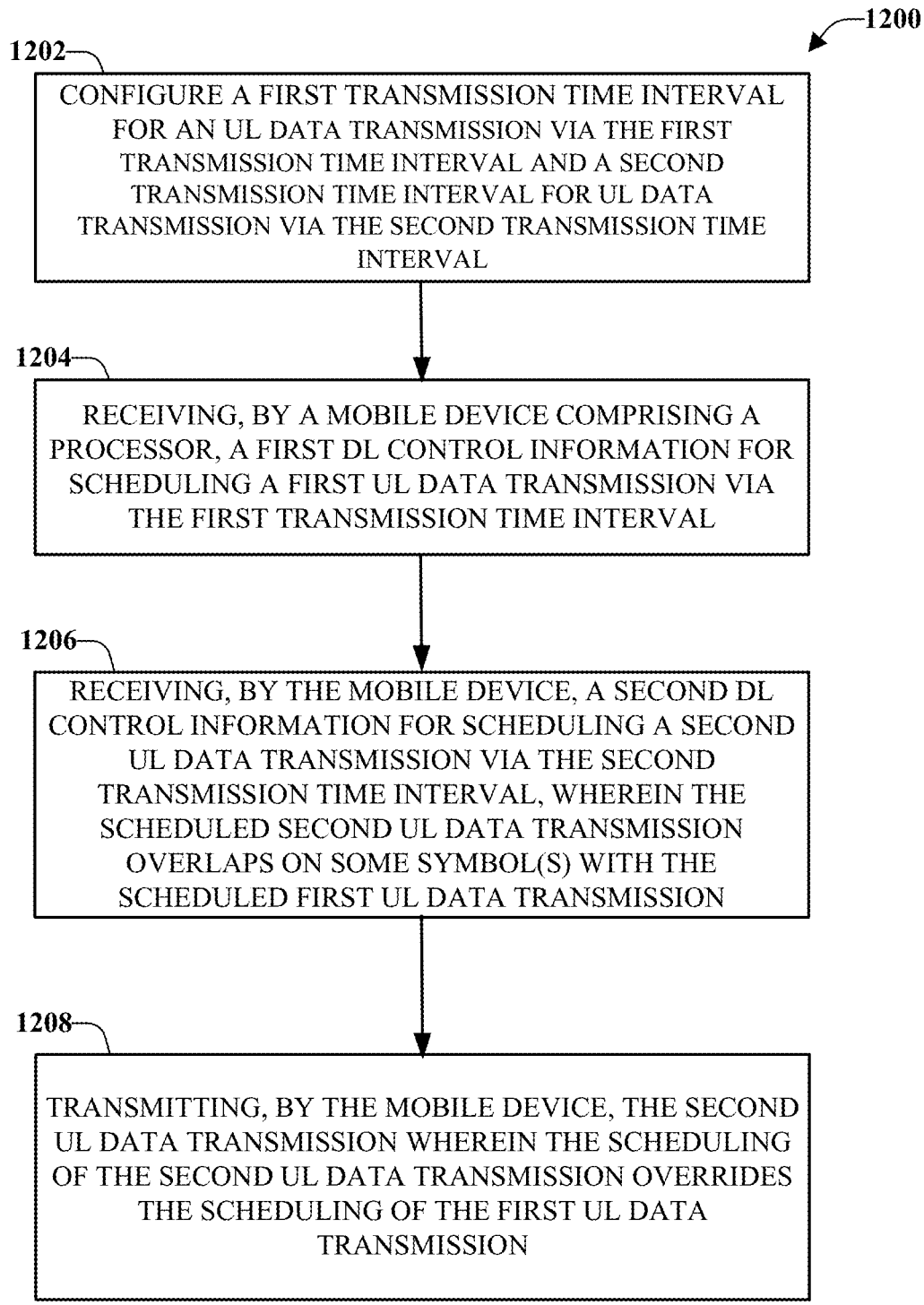
FIG. 12 illustrates another example, non-limiting method for a mobile device comprising a processor for improved uplink transmission in shortened transmission time intervals in accordance with one or more embodiments described herein.

FIG. 12 illustrates another example, non-limiting method 1200 for a mobile device comprising a processor for improved uplink transmission in shortened transmission time intervals in accordance with one or more embodiments described herein. The method starts, at 1202, when a first TTI for scheduling UL data transmission via the first TTI and a second TTI for scheduling UL data transmission via the second TTI are configured.

At 1204, a mobile device comprising a processor can receive a first DL control information for scheduling a first UL data transmission via the first TTI. At 1206, the mobile device can receive a second DL control information for scheduling a second UL data transmission via the second TTI. The scheduled second UL data transmission overlaps on some symbol(s) with the scheduled first UL data transmission. Further, at 1208, the mobile device can transmit the second UL data transmission wherein the scheduling of the second UL data transmission overrides the scheduling of the first UL data transmission.

According to an implementation, the second DL control information for scheduling the second UL data transmission is received at later timing than the first DL control information for scheduling the first UL data transmission.

In accordance with some implementations, the mobile device can monitor the DL control channel for scheduling a second UL data transmission via the second TTI wherein the scheduled second UL data transmission overlaps on some symbol(s) with the scheduled first UL data transmission.

In some implementations, scheduling of the UL data transmission with the longer TTI length overrides the scheduling of the UL data transmission with the shorter TTI length. Further to this implementation, the mobile device can transmit the UL data transmission with the longer TTI.

According to some implementations, if the scheduling of the UL data transmission with shorter TTI length overrides the scheduling of the UL data transmission with longer TTI length, the mobile device can transmit the UL data transmission with short TTI. In some implementations, the scheduled first UL data transmission via the first TTI and the scheduled second UL data transmission via the second TTI are partially overlapped in time domain. In another implementation, the UL data transmission with shorter TTI is fully overlapped in time domain with the UL data transmission with longer TTI. According to some implementations, the mobile device does not transmit the overridden UL data transmission.

In some implementations, the mobile device can transmit a third UL data transmission in the non-overlapped symbol(s) of the overridden UL data transmission. In some implementations, the mobile device can transmit a third UL data transmission in the non-overlapped symbol(s) of the overridden UL data transmission if the ratio of non-overlapped symbol(s) and overlapped symbol(s) of the overridden UL data transmission is larger than or equal to a threshold. According to some implementations, the third UL data transmission is punctured from the overridden UL data transmission. In an implementation, the transmission parameters of the third UL data transmission are derived at least from the overridden UL data transmission. According to some implementation, the MCS of the third UL data transmission is the same as the overridden UL data transmission. Further, in some implementations, the MCS of the third UL data transmission is derived from at least the MCS of the overridden UL data transmission and/or the ratio of non-overlapped symbol(s) and overlapped symbol(s) of the overridden UL data transmission.

According to some implementations, the HARQ process of the third UL data transmission is the same as the overridden UL data transmission. In some implementations, the HARQ process of the third UL data transmission is different from the first UL data transmission via the first TTI and the second data transmission via the second TTI.

In accordance with some implementations, the RV of the third UL data transmission is the same as the overridden UL data transmission. In an implementation, the RV of the third UL data transmission is set to zero. In some implementation, the TBS of the third UL data transmission is the same as the overridden UL data transmission. In an implementation, the TBS of the third UL data transmission is derived at least from the number of the non-overlapped symbol(s) or the ratio of non-overlapped symbol(s) and overlapped symbol(s) of the overridden UL data transmission.

Further, in some implementations, the frequency resource allocation of the third UL data transmission is the same as the overridden UL data transmission. According to an implementation, the frequency resource allocation of the third UL data transmission is determined from one of the frequency resource allocation of the first UL data transmission and the second UL data transmission. In another implementation, the determination of the frequency resource allocation of the third UL data transmission depends on the scheduled frequency resource size of the first UL data transmission and the second UL data transmission.

The frequency resource allocation of the third UL data transmission can be the same as the frequency resource allocation with larger scheduled frequency resource size between the first UL data transmission and the second UL data transmission, in accordance with some implementations. The frequency resource allocation of the third UL data transmission can be the same as the frequency resource allocation with smaller scheduled frequency resource size between the first UL data transmission and the second UL data transmission, according to some implementations. The TTI length of the first TTI and the second TTI can be different, according to an implementation. In another implementation, the TTI length of the first TTI can be longer than the TTI length of the second TTI. In a further implementation, the TTI length of the first TTI is one subframe and the first UL data transmission is on PUSCH. The TTI length of the second TTI is one of 1/2/3/4/7 symbol TTIs and the second UL data transmission is on sPUSCH. In yet another implementation, the TTI length of the second TTI is longer than the TTI length of the first TTI. In still another implementation, the TTI length of the second TTI is one subframe and the second UL data transmission is on PUSCH. Further to this implementation, the TTI length of the first TTI is one of 1/2/3/4/7 symbol TTIs and the first UL data transmission is on sPUSCH. According to another implementation, the TTI length of the first TTI is one of 1/2/3/4/7 symbol TTIs and the first UL data transmission is on sPUSCH. Further to this implementation, the TTI length of the second TTI is one of 1/2/3/4/7 symbol TTIs and the second UL data transmission is on sPUSCH. According to some implementations, the scheduled second UL data transmission and the scheduled first UL data transmission overlap in some frequency resources.

The following provides further example, non-limiting details related to implementation of the various aspects discussed herein. Packet data latency can be an important metric for performance evaluation. Reducing packet data latency improves the system performance. In 3GPP RP-150465, "New SI proposal: Study on Latency reduction techniques for LTE," Ericsson, Huawei, the study item aims to investigate and standardize techniques of latency reduction.

According to the above noted proposal, the objective of the study item is to study enhancements to the Evolved Universal Terrestrial Radio Access Network (E-UTRAN) radio system in order to significantly reduce the packet data latency over the LTE Uu air interface (e.g., an air interface between a mobile device and a base station device) for an active mobile device and significantly reduce the packet data transport round trip latency for mobile devices that have been inactive for a longer period (in connected state). The study area includes resource efficiency, including air interface capacity, battery lifetime, control channel resources, specification impact and technical feasibility. Both frequency division duplex (FDD) and time division duplex (TDD) modes are considered.

According to the proposal, two areas should be studied and documented: (1) Fast uplink access solutions—for active mobile devices and mobile devices that have been inactive a longer time, but are kept in radio resource control (RRC) connected, focus should be on reducing user plane latency for the scheduled uplink (UL) transmission and getting a more resource efficient solution with protocol and signaling enhancements, compared to the pre-scheduling solutions allowed by the standard today, both with and without preserving the current transmission time interval (TTI) length and processing time; and (2) TTI shortening and reduced processing times—to assess specification impact and study feasibility and performance of TTI lengths between 0.5 milliseconds (ms) and one orthogonal frequency division multiplexing (OFDM) symbol, taking into account impact on reference signals and physical layer control signaling.

TTI shortening and processing time reduction can be considered as an effective solution for reducing latency, as the time unit for transmission can be reduced e.g., from 1 ms (14 OFDM) symbol to 1~7 OFDM symbols and the delay caused by decoding can be reduced as well. On the other hand, reducing the length of TTI may also have significant impact to current system design as the physical channels are developed based on 1 ms structure.

For control channels, in LTE there are two types of control channel, one of them is physical downlink control channel (PDCCH), which is a wide band signal across whole system bandwidth and occupying the first several (e.g., 1~4) OFDM symbols of 1 ms subframe. The region occupied by PDCCH is usually named as control region, and the rest of the subframe is usually known as data region. A second type of control channel, Enhanced Physical Downlink Control Channel (ePDCCH), occupies the data region in the time domain, while only part of the bandwidth in the frequency domain. More detail description can be found in the following quotation from 3GPP TS 36.213 v13.1.1, "E-UTRA Physical layer procedures (Release 13)" and 3GPP TR 36.211 V13.1.0, "E-UTRA Study on latency reduction techniques for LTE (Release 13)."

As stated in 3GPP TS 36.213 v13.1.1, "E-UTRA Physical layer procedures (Release 13)," in section 9.1.3: Control Format Indicator (CFI) assignment procedure:

PHICH duration is signaled by higher layers according to Table 6.9.3-1 in 3GPP TR 36.211 V13.1.0, "E-UTRA Study on latency reduction techniques for LTE (Release 13)." The duration signaled puts a lower limit on the size of the control region determined from the control format indicator (CFI). When $N_{RB}^{DL}>10$, if extended Physical Hybrid-ARQ Indicator Channel (PHICH) duration is indicated by higher layers then the mobile device shall assume that CFI is equal to PHICH duration. In subframes indicated by higher layers to decode physical multicast channel (PMCH), when $N_{RB}^{DL}>10$, a mobile device may assume that CFI is equal to the value of the higher layer parameter non-MBSFNregionLength, as described in 3GPP TS 36.331, "Evolved Universal Terrestrial Radio Access (E-UTRA); Radio Resource Control (RRC) protocol specification."

As stated in 3GPP TR 36.211 V13.1.0, "E-UTRA Study on latency reduction techniques for LTE (Release 13)," section 6.7: Physical control format indicator channel:

The physical control format indicator channel carries information about the number of OFDM symbols used for transmission of PDCCHs in a subframe. The set of OFDM symbols possible to use for PDCCH in a subframe is given by Table 6.7-1.

TABLE 6.7-1

Number of OFDM symbols used for PDCCH

| Subframe | Number of OFDM symbols for PDCCH when $N_{RB}^{DL} >10$ | Number of OFDM symbols for PDCCH when $N_{RB}^{DL} \leq 10$ |
| --- | --- | --- |
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

The mobile device may assume the PCFICH is transmitted when the number of OFDM symbols for PDCCH is greater than zero unless stated otherwise in 3GPP TS 36.212: "Evolved Universal Terrestrial Radio Access (E-UTRA); Multiplexing and channel coding," clause 12.

As stated in 3GPP TR 36.211 V13.1.0, "E-UTRA Study on latency reduction techniques for LTE (Release 13)," Section 6.2.4: Resource-element groups:

Resource-element groups are used for defining the mapping of control channels to resource elements. A resource-element group is represented by the index pair (k',l') of the resource element with the lowest index k in the group with all resource elements in the group having the same value of l. The set of resource elements (k,l) in a resource-element group depends on the number of cell-specific reference signals configured as described below with $k_0=n_{PRB} \cdot N_{sc}^{RB}$, $0 \leq n_{PRB} < N_{RB}^{DL}$. In the first OFDM symbol of the first slot in a subframe the two resource-element groups in physical resource block $n_{PRB}$ consist of resource elements (k,l=0) with $k=k_0+0, k_0+1, \ldots, k_0+5$ and $k=k_0+6, k_0+7, \ldots, k_0+11$, respectively. In the second OFDM symbol of the first slot in a subframe in case of one or two cell-specific reference signals configured, the three resource-element groups in physical resource block $n_{PRB}$ consist of resource elements (k,l=1) with $k=k_0+0, k_0+1, \ldots, k_0+3, k=k_0+4, k_0+5, \ldots, k_0+7$ and $k=k_0+8, k_0+9, \ldots, k_0+11$, respectively. In the second OFDM symbol of the first slot in a subframe in case of four cell-specific reference signals configured, the two resource-element groups in physical resource block $n_{PRB}$ consist of resource elements (k,l=1) with $k=k_0+0, k_0+1, \ldots, k_0+5$ and $k=k_0+6, k_0+7, \ldots, k_0+11$, respectively. In the third OFDM symbol of the first slot in a subframe, the three resource-element groups in physical resource block $n_{PRB}$ consist of resource elements (k,l=2) with $k=k_0+0, k_0+1, \ldots, k_0+3, k=k_0+4, k_0+5, \ldots, k_0+7$ and $k=k_0+8, k_0+9, \ldots, k_0+11$, respectively. In the fourth OFDM symbol of the first slot in a subframe in case of normal cyclic prefix, the three resource-element groups in physical resource block $n_{PRB}$ consist of resource elements (k,l=3) with k=$k_0$+0, $k_0$+1, ..., $k_0$+3, k=$k_0$+4, $k_0$+5, ..., $k_0$+7 and k=$k_0$+8, $k_0$+9, ..., $k_0$+11, respectively. In the fourth OFDM symbol of the first slot in a subframe in case of extended cyclic prefix, the two resource-element groups in physical resource block $n_{PRB}$ consist of resource elements (k,l=3) with k=$k_0$+0, $k_0$+1, ..., $k_0$+5 and k=$k_0$+6, $k_0$+7, ..., $k_0$+11, respectively. Mapping of a symbol-quadruplet ⟨z(i), z(i+1), z(i+2), z(i+3)⟩ onto a resource-element group represented by resource-element (k',l') is defined such that elements z(i) are mapped to resource elements (k,l) of the resource-element group not used for cell-specific reference signals in increasing order of i and k. In case a single cell-specific reference signal is configured, cell-specific reference signals shall be assumed to be present on antenna ports 0 and 1 for the purpose of mapping a symbol-quadruplet to a resource-element group, otherwise the number of cell-specific reference signals shall be assumed equal to the actual number of antenna ports used for cell-specific reference signals. The mobile device shall not make any assumptions about resource elements assumed to be reserved for reference signals but not used for transmission of a reference signal. For frame structure type 3, if the higher layer parameter subframeStartPosition indicates 's07' and the downlink transmission starts in the second slot of a subframe, the above definition applies to the second slot of that subframe instead of the first slot.

Section 6.2.4A: Enhanced Resource-Element Groups (EREGs) of 3GPP TR 36.211 V13.1.0, "E-UTRA Study on latency reduction techniques for LTE (Release 13)" states:

EREGs are used for defining the mapping of enhanced control channels to resource elements. There are 16 EREGs, numbered from 0 to 15, per physical resource block pair. Number all resource elements, except resource elements carrying DM-RS for antenna ports p={107,108,109,110} for normal cyclic prefix or p={107,108} for extended cyclic prefix, in a physical resource-block pair cyclically from 0 to 15 in an increasing order of first frequency, then time. All resource elements with number i in that physical resource-block pair constitutes EREG number i. For frame structure type 3, if the higher layer parameter subframeStartPosition indicates 's07' and the downlink transmission starts in the second slot of a subframe, the above definition applies to the second slot of that subframe instead of the first slot.

As stated in Section 6.8A: Enhanced physical downlink control channel 6.8A.1 EPDCCH formats of 3GPP TR 36.211 V13.1.0, "E-UTRA Study on latency reduction techniques for LTE (Release 13)":

The enhanced physical downlink control channel (EPDCCH) carries scheduling assignments. An enhanced physical downlink control channel is transmitted using an aggregation of one or several consecutive enhanced control channel elements (ECCEs) where each ECCE consists of multiple enhanced resource element groups (EREGs), defined in clause 6.2.4A. The number of ECCEs used for one EPDCCH depends on the EPDCCH format as given by Table 6.8A.1-2 and the number of EREGs per ECCE is given by Table 6.8A.1-1. Both localized and distributed transmission is supported. An EPDCCH can use either localized or distributed transmission, differing in the mapping of ECCEs to EREGs and PRB pairs. A mobile device shall monitor multiple EPDCCHs as defined in 3GPP TS 36.213 (3GPP TS 36.212: "Evolved Universal Terrestrial Radio Access (E-UTRA); Multiplexing and channel coding". One or two sets of physical resource-block pairs which a mobile device shall monitor for EPDCCH transmissions can be configured. All EPDCCH candidates in EPDCCH set $X_m$ use either only localized or only distributed transmission as configured by higher layers. Within EPDCCH set $X_m$ in subframe i, the ECCEs available for transmission of EPDCCHs are numbered from 0 to $N_{ECCE,m,i}$-1 and ECCE number n corresponds to: EREGs numbered (n mod $N_{ECCE}^{RB}$)+ $jN_{ECCE}^{RB}$ in PRB index $\lfloor n/N_{ECCE}^{RB} \rfloor$ for localized mapping, and EREGs numbered $\lfloor n/N_{RB}^{X_m} \rfloor + jN_{ECCE}^{RB}$ in PRB indices (n+j max(1, $N_{RB}^{X_m}/N_{EREG}^{ECCE}$))mod $N_{RB}^{X_m}$ for distributed mapping, where j=0, 1, ..., $N_{EREG}^{ECCE}$-1, $N_{EREG}^{ECCE}$ is the number of EREGs per ECCE, and $N_{ECCE}^{RB}$=16/$N_{EREG}^{ECCE}$ is the number of ECCEs per resource-block pair. The physical resource-block pairs constituting EPDCCH set $X_m$ are in this paragraph assumed to be numbered in ascending order from 0 to $N_{RB}^{X_m}$-1.

TABLE 6.8A.1-1

Number of EREGs per ECCE, $N_{EREG}^{ECCE}$

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

TABLE 6.8A.1-2

Supported EPDCCH formats

Number of ECCEs for one EPDCCH, $N_{ECCE}^{EPDCCH}$

| EPDCCH format | Case A | | Case B | |
|---|---|---|---|---|
| | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

Case A in Table 6.8A.1-2 is used when the conditions corresponding to case 1 in clause 9.1.4 of 3GPP TS 36.212 V13.1.0, "E-UTRA Multiplexing and channel coding (Release 13)" are satisfied, otherwise case B is used. The quantity $n_{EPDCCH}$ for a particular mobile device and referenced in 3GPP TS 36.212 V13.1.0, "E-UTRA Multiplexing and channel coding (Release 13)," is defined as the number of downlink resource elements (k,l) available for EPDCCH transmission in a physical resource-block pair configured for possible EPDCCH transmission of EPDCCH set $X_0$ and fulfilling all of the following criteria: they are part of any one of the 16 EREGs in the physical resource-block pair, and they are assumed by the mobile device not to be used for cell-specific reference signals, where the positions of the cell-specific reference signals are given by clause 6.10.1.2 with the number of antenna ports for and the frequency shift of cell-specific reference signals derived as described in clause 6.10.1.2 unless other values for these parameters are provided by clause 9.1.4.3 in 3GPP TS 36.212 V13.1.0, "E-UTRA Multiplexing and channel coding (Release 13)," and they are assumed by the mobile device not to be used for transmission of CSI reference signals, where the positions of the CSI reference signals are given by clause 6.10.5.2 with the configuration for zero power CSI reference signals obtained as described in clause 6.10.5.2 unless other values are provided by clause 9.1.4.3 in 3GPP TS 36.212 V13.1.0, "E-UTRA Multiplexing and channel coding (Release 13)," and with the configuration for non-zero power CSI reference signals obtained as described in clause 6.10.5.2, and for frame structure type 1 and 2, the index l in the first slot in a subframe fulfils $l \geq l_{EPDCCHStart}$ where $l_{EPDCCHStart}$ is given by clause 9.1.4.1 of 3GPP TS 36.212 V13.1.0, "E-UTRA Multiplexing and channel coding (Release 13)," and for frame structure type 3, if the higher layer parameter subframeStartPosition indicates 's07' and if the downlink transmission starts in the second slot of a subframe; the index l in the second slot in the subframe fulfils $l \geq l_{EPDCCHStart}$ where $l_{EPDCCHStart}$ is given by clause 7.1.6.4 3GPP TS 36.212 V13.1.0, "E-UTRA Multiplexing and channel coding (Release 13)"—otherwise—the index l in the first slot in the subframe fulfils $l \geq l_{EPDCCHStart}$ where $l_{EPDCCHStart}$ is given by clause 7.6.1.4 of 3GPP TS 36.212 V13.1.0, "E-UTRA Multiplexing and channel coding (Release 13)."

According to the various aspects provided herein, downlink control information (DCI) can be carried on a control channel (e.g. PDCCH/ePDCCH). Downlink control information can be used to carry scheduling for downlink data or uplink data. Downlink control information can also be used carry special messages, (e.g. triggering some procedure or control mobile device power), from eNB to the UE. Several different DCI formats exist to serve the above different purposes. Taking downlink data scheduling as an example, DCI for downlink data scheduling can comprise the resource allocation (in the frequency domain), modulation and coding scheme, redundancy version, HARQ process ID, and other information require to perform the reception.

More detail example can be found in the below quotation from 3GPP TS 36.212 V13.1.0, "E-UTRA Multiplexing and channel coding (Release 13)":

5.3.3.1.5D Format 2D

The following information is transmitted by means of the DCI format 2D: Carrier indicator—0 or 3 bits. The field is present according to the definitions in 3GPP TS 36.211: "Evolved Universal Terrestrial Radio Access (E-UTRA); Physical channels and modulation." Resource allocation header (resource allocation type 0/type 1)—1 bit as defined in section 7.1.6 of 3GPP TS 36.211: "Evolved Universal Terrestrial Radio Access (E-UTRA); Physical channels and modulation." If downlink bandwidth is less than or equal to 10 PRBs, there is no resource allocation header and resource allocation type 0 is assumed. Resource block assignment: For resource allocation type 0 as defined in section 7.1.6.1 of 3GPP TS 36.211: "Evolved Universal Terrestrial Radio Access (E-UTRA); Physical channels and modulation" $\lceil N_{RB}^{DL}/P \rceil$ bits provide the resource allocation. For resource allocation type 1 as defined in section 7.1.6.2 of 3GPP TS 36.211: "Evolved Universal Terrestrial Radio Access (E-UTRA); Physical channels and modulation;" $\lceil \log_2(P) \rceil$ bits of this field are used as a header specific to this resource allocation type to indicate the selected resource blocks subset; 1 bit indicates a shift of the resource allocation span; $-(\lfloor N_{RB}^{DL}/P \rfloor - \lceil \log_2(P) \rceil - 1)$ bits provide the resource allocation, where the value of P depends on the number of DL resource blocks as indicated in section 7.1.6.1 of 3GPP TS 36.211: "Evolved Universal Terrestrial Radio Access (E-UTRA); Physical channels and modulation," TPC command for PUCCH—2 bits as defined in section 5.1.2.1 of 3GPP TS 36.211: "Evolved Universal Terrestrial Radio Access (E-UTRA); Physical channels and modulation;" Downlink Assignment Index—number of bits as specified in Table 5.3.3.1.2-2; HARQ process number—3 bits (for cases with FDD primary cell), 4 bits (for cases with TDD primary cell); Antenna port(s), scrambling identity and number of layers—3 bits as specified in Table 5.3.3.1.5C-1 where $n_{SCID}$ is the scrambling identity for antenna ports 7 and 8 defined in section 6.10.3.1 of 3GPP TS 36.201: "Evolved Universal Terrestrial Radio Access (E-UTRA); Physical Layer—General Description," or 4 bits as specified in Table 5.3.3.1.5C-2 where $n_{SCID}$ is the scrambling identity for antenna ports 7, 8, 11 and 13 defined in section 6.10.3.1 of 3GPP TS 36.201: "Evolved Universal Terrestrial Radio Access (E-UTRA); Physical Layer—General Description" when higher layer parameter dmrs-tableAlt is set to 1. SRS request—[0-1] bit. This field can only be present for TDD operation and if present is defined in section 8.2 of 3GPP TS 36.211: "Evolved Universal Terrestrial Radio Access (E-UTRA); Physical channels and modulation." In addition, for transport block 1: Modulation and coding scheme—5 bits as defined in section 7.1.7 of 3GPP TS 36.211: "Evolved Universal Terrestrial Radio Access (E-UTRA); Physical channels and modulation;" New data indicator—1 bit; Redundancy version—2 bits.

In addition, for transport block 2: Modulation and coding scheme—5 bits as defined in section 7.1.7 of 3GPP TS 36.211: "Evolved Universal Terrestrial Radio Access (E-UTRA); Physical channels and modulation;" New data indicator—1 bit; Redundancy version—2 bits; PDSCH RE Mapping and Quasi-Co-Location Indicator—2 bits as defined in sections 7.1.9 and 7.1.10 of 3GPP TS 36.211: "Evolved Universal Terrestrial Radio Access (E-UTRA); Physical channels and modulation;" HARQ-ACK resource offset (this field is present when this format is carried by EPDCCH. This field is not present when this format is carried by PDCCH)—2 bits as defined in section 10.1 of 3GPP TS 36.211: "Evolved Universal Terrestrial Radio Access (E-UTRA); Physical channels and modulation." The 2 bits are set to 0 when this format is carried by EPDCCH on a secondary cell, or when this format is carried by EPDCCH on the primary cell scheduling PDSCH on a secondary cell and the mobile device is configured with PUCCH format 3 for HARQ-ACK feedback. If both transport blocks are enabled; transport block 1 is mapped to codeword 0; and transport block 2 is mapped to codeword 1. In case one of the transport blocks is disabled; the transport block to codeword mapping is specified according to Table 5.3.3.1.5-2. For the single enabled codeword, Value=4, 5, 6 in Table 5.3.3.1.5C-1 are only supported for retransmission of the corresponding transport block if that transport block has previously been transmitted using two, three or four layers, respectively. If the number of information bits in format 2D carried by PDCCH belongs to one of the sizes in Table 5.3.3.1.2-1, one zero bit shall be appended to format 2D.

According to the aspects provided herein, since different DCI formats can have different payload sizes and the mobile device might need to acquire different DCI formats, the mobile device should decode several decoding candidates without knowing which or whether the candidate(s) exist. This type of decoding is referred to as blind decoding. The resource of decoding candidate(s) is known as a search space of a UE. The search space is further partition to common search space and mobile device specific search space which may contain different type of messages. Within search space, mobile device may search for different DCI format. Also, within search space, mobile device can monitor control channel addressed different identifier (e.g. Radio Network Temporary Identifier (RNTI)), which can be performed by descrambling CRC of a decoding candidate with different RNTI and check which one would pass the check.

Following are related procedure quoted from 3GPP TS 36.213 v13.1.1, "E-UTRA Physical layer procedures (Release 13)" and 3GPP TS 36.212 V13.1.0, "E-UTRA Multiplexing and channel coding (Release 13)":

9.1.1 PDCCH assignment procedure

The control region of each serving cell consists of a set of CCEs, numbered from 0 to $N_{CCE,k}-1$ according to subclause 6.8.1 in 3GPP TS 36.211: "Evolved Universal Terrestrial Radio Access (E-UTRA); Physical channels and modulation," where $N_{CCE,k}$ is the total number of CCEs in the control region of subframe k.

The mobile device shall monitor a set of PDCCH candidates on one or more activated serving cells as configured by higher layer signaling for control information, where monitoring implies attempting to decode each of the PDCCHs in the set according to all the monitored DCI formats. A BL/CE mobile device is not required to monitor PDCCH. The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by $$L\{(Y_k+m')\mod \lfloor N_{CCE,k}/L \rfloor\}+i$$

where $Y_k$ is defined below, i=0, ..., L−1. For the common search space m'=m. For the PDCCH mobile device specific search space, for the serving cell on which PDCCH is monitored, if the monitoring mobile device is configured with carrier indicator field then m'=m+ $M^{(L)} \cdot n_{CI}$ where $n_{CI}$ is the carrier indicator field value, else if the monitoring mobile device is not configured with carrier indicator field then m'=m, where m= 0, ..., $M^{(L)}$−1. $M^{(L)}$ is the number of PDCCH candidates to monitor in the given search space. If a mobile device is configured with higher layer parameter cif-InSchedulingCell-r13, the carrier indicator field value corresponds to cif-InSchedulingCell-r13, otherwise, the carrier indicator field value is the same as ServCellIndex given in 3GPP TS 36.331, "Evolved Universal Terrestrial Radio Access (E-UTRA); Radio Resource Control (RRC) protocol specification." The mobile device shall monitor one common search space in every non-DRX subframe at each of the aggregation levels 4 and 8 on the primary cell. A mobile device shall monitor common search space on a cell to decode the PDCCHs necessary to receive MBMS on that cell when configured by higher layers. If a mobile device is not configured for EPDCCH monitoring, and if the mobile device is not configured with a carrier indicator field, then the mobile device shall monitor one PDCCH UE-specific search space at each of the aggregation levels 1, 2, 4, 8 on each activated serving cell in every non-DRX subframe. If a mobile device is not configured for EPDCCH monitoring, and if the mobile device is configured with a carrier indicator field, then the mobile device shall monitor one or more UE-specific search spaces at each of the aggregation levels 1, 2, 4, 8 on one or more activated serving cells as configured by higher layer signaling in every non-DRX subframe. If a mobile device is configured for EPDCCH monitoring on a serving cell, and if that serving cell is activated, and if the mobile device is not configured with a carrier indicator field, then the mobile device shall monitor one PDCCH UE-specific search space at each of the aggregation levels 1, 2, 4, 8 on that serving cell in all non-DRX subframes where EPDCCH is not monitored on that serving cell. If a mobile device is configured for EPDCCH monitoring on a serving cell, and if that serving cell is activated, and if the mobile device is configured with a carrier indicator field, then the mobile device shall monitor one or more PDCCH UE-specific search spaces at each of the aggregation levels 1, 2, 4, 8 on that serving cell as configured by higher layer signaling in all non-DRX subframes where EPDCCH is not monitored on that serving cell. The common and PDCCH UE-specific search spaces on the primary cell may overlap. A mobile device configured with the carrier indicator field associated with monitoring PDCCH on serving cell c shall monitor PDCCH configured with carrier indicator field and with CRC scrambled by C-RNTI in the PDCCH mobile device specific search space of serving cell c. A mobile device configured with the carrier indicator field associated with monitoring PDCCH on the primary cell shall monitor PDCCH configured with carrier indicator field and with CRC scrambled by SPS C-RNTI in the PDCCH mobile device specific search space of the primary cell. The mobile device shall monitor the common search space for PDCCH without carrier indicator field. For the serving cell on which PDCCH is monitored, if the mobile device is not configured with a carrier indicator field, it shall monitor the PDCCH mobile device specific search space for PDCCH without carrier indicator field, if the mobile device is configured with a carrier indicator field it shall monitor the PDCCH mobile device specific search space for PDCCH with carrier indicator field. If the mobile device is not configured with a LAA Scell, the mobile device is not expected to monitor the PDCCH of a secondary cell if it is configured to monitor PDCCH with carrier indicator field corresponding to that secondary cell in another serving cell. If the mobile device is configured with a LAA Scell, the mobile device is not expected to monitor the PDCCH mobile device specific space of the LAA SCell if it is configured to monitor PDCCH with carrier indicator field corresponding to that LAA Scell in another serving cell, where the mobile device is not expected to be configured to monitor PDCCH with carrier indicator field in an LAA Scell; where the mobile device is not expected to be scheduled with PDSCH starting in the second slot in a subframe in an LAA Scell if the mobile device is configured to monitor PDCCH with carrier indicator field corresponding to that LAA S cell in another serving cell. For the serving cell on which PDCCH is monitored, the mobile device shall monitor PDCCH candidates at least for the same serving cell. A mobile device configured to monitor PDCCH candidates with CRC scrambled by C-RNTI or SPS C-RNTI with a common payload size and with the same first CCE index $n_{CCE}$ (as described in subclause 10.1) but with different sets of DCI information fields as defined in 3GPP TS 36.212: "Evolved Universal Terrestrial Radio Access (E-UTRA); Multiplexing and channel coding" in the common search space PDCCH mobile device specific search space on the primary cell shall assume that for the PDCCH candidates with CRC scrambled by C-RNTI or SPS C-RNTI, if the mobile device is configured with the carrier indicator field associated with monitoring the PDCCH on the primary cell, only the PDCCH in the common search space is transmitted by the primary cell; otherwise, only the PDCCH in the mobile device specific search space is transmitted by the primary cell. A mobile device configured to monitor PDCCH candidates in a given serving cell with a given DCI format size with CIF, and CRC scrambled by C-RNTI, where the PDCCH candidates may have one or more possible values of CIF for the given DCI format size, shall assume that a PDCCH candidate with the given DCI format size can be transmitted in the given serving cell in any PDCCH mobile device specific search space corresponding to any of the possible values of CIF for the given DCI format size. If a serving cell is a LAA Scell, and if the higher layer parameter subframeStartPosition for the Scell indicates 's07', The mobile device monitors PDCCH UE-specific search space candidates on the Scell in both the first and second slots of a subframe, and the aggregation levels defining the search spaces are listed in Table 9.1.1-1A; otherwise, the aggregation levels defining the search spaces are listed in Table 9.1.1-1. If a serving cell is a LAA Scell, the mobile device may receive PDCCH with DCI CRC scrambled by CC-RNTI as described in subclause 13A on the LAA Scell. The DCI formats that the mobile device shall monitor depend on the configured transmission mode per each serving cell as defined in subclause 7.1. If a mobile device is configured with higher layer parameter skipMonitoringDCI-format0-1A for a serving cell, the mobile device is not required to monitor the PDCCH with DCI Format 0/1A in the mobile device specific search space for that serving cell. If a mobile device is configured with higher layer parameter pdcch-candidateReductions for a mobile device specific search space at aggregation level L for a serving cell, the corresponding number of PDCCH candidates is given by $M^{(L)}=\text{round}(a \times M_{full}^{(L)})$, where the value of a is determined according to Table 9.1.1-2 and $M_{full}^{(L)}$ is determined according to Table 9.1.1-1 by replacing $M^{(L)}$ with $M_{full}^{(L)}$.

TABLE 9.1.1-1

PDCCH candidates monitored by a UE

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

TABLE 9.1.1-1A

PDCCH UE-specific search space candidates monitored by a mobile device on LAA Scell

| Type | Search space $S_k^{(L)}$ Aggregation level L | Size [in CCEs] | Number of PDCCH candidates $M^{(L)}$ in first slot | Number of PDCCH candidates $M^{(L)}$ in second slot |
|---|---|---|---|---|
| UE-specific | 1 | 6 | 6 | 6 |
| | 2 | 12 | 6 | 6 |
| | 4 | 8 | 2 | 2 |
| | 8 | 16 | 2 | 2 |

TABLE 9.1.1-2

Scaling factor for PDCCH candidates reduction

| pdcch-candidateReductions | Value of a |
|---|---|
| 0 | 0 |
| 1 | 0.33 |
| 2 | 0.66 |
| 3 | 1 |

For the common search spaces, $Y_k$ is set to 0 for the two aggregation levels L=4 and L=8. For the UE-specific search space $S_k^{(L)}$ at aggregation level L, the variable $Y_k$ is defined by $Y_k=(A \cdot Y_{k-1}) \bmod D$ where $Y_{-1}=n_{RNTI} \neq 0$, A=39827, D=65537 and $k=\lfloor n_s/2 \rfloor$, $n_s$ is the slot number within a radio frame. The RNTI value used for $n_{RNTI}$ is defined in subclause 7.1 in downlink and subclause 8 in uplink.

9.1.4 EPDCCH assignment procedure

For each serving cell, higher layer signaling can configure a mobile device with one or two EPDCCH-PRB-sets for EPDCCH monitoring. The PRB-pairs corresponding to an EPDCCH-PRB-set are indicated by higher layers as described in subclause 9.1.4.4. Each EPDCCH-PRB-set consists of set of ECCEs numbered from 0 to $N_{ECCE,p,k}-1$ where $N_{ECCE,p,k}$ is the number of ECCEs in EPDCCH-PRB-set p of subframe k. Each EPDCCH-PRB-set can be configured for either localized EPDCCH transmission or distributed EPDCCH transmission. The mobile device shall monitor a set of EPDCCH candidates on one or more activated serving cells as configured by higher layer signaling for control information, where monitoring implies attempting to decode each of the EPDCCHs in the set according to the monitored DCI formats. A BL/CE mobile device is not required to monitor EPDCCH. The set of EPDCCH candidates to monitor are defined in terms of EPDCCH UE-specific search spaces. For each serving cell, the subframes in which the mobile device monitors EPDCCH UE-specific search spaces are configured by higher layers. The mobile device shall not monitor EPDCCH For TDD and normal downlink CP, in special subframes for the special subframe configurations 0 and 5 shown in Table 4.2-1 of 3GPP TS 36.211: "Evolved Universal Terrestrial Radio Access (E-UTRA); Physical channels and modulation." For TDD and extended downlink CP, in special subframes for the special subframe configurations 0, 4 and 7 shown in Table 4.2-1 of 3GPP TS 36.211: "Evolved Universal Terrestrial Radio Access (E-UTRA); Physical channels and modulation." In subframes indicated by higher layers to decode PMCH. For TDD and if the mobile device is configured with different UL/DL configurations for the primary and a secondary cell, in a downlink subframe on the secondary cell when the same subframe on the primary cell is a special subframe and the mobile device is not capable of simultaneous reception and transmission on the primary and secondary cells. An EPDCCH UE-specific search space $ES_k^{(L)}$ at aggregation level L∈{1, 2, 4, 8, 16, 32} is defined by a set of EPDCCH candidates. For an EPDCCH-PRB-set p, the ECCEs corresponding to EPDCCH candidate m of the search space $ES_k^{(L)}$ are given by $$L\left\{\left(Y_{p,k}+\left\lfloor\frac{m\cdot N_{ECCE,p,k}}{L\cdot M_p^{(L)}}\right\rfloor+b\right)\bmod\lfloor N_{ECCE,p,k}/L\rfloor\right\}+i$$

where $y_{p,k}$ is defined below, i=0, . . . , L−1 b=$n_{CI}$ if the mobile device is configured with a carrier indicator field for the serving cell on which EPDCCH is monitored, otherwise b=0 $n_{CI}$ is the carrier indicator field value, m=0, 1, . . . $M_p^{(L)}$−1, If the mobile device is not configured with a carrier indicator field for the serving cell on which EPDCCH is monitored, $M_p^{(L)}$ is the number of EPDCCH candidates to monitor at aggregation level L in EPDCCH-PRB-set p for the serving cell on which EPDCCH is monitored, as given in Tables 9.1.4-1a, 9.1.4-1b, 9.1.4-2a, 9.1.4-2b, 9.1.4-3a, 9.1.4-3b, 9.1.4-4a, 9.4.4-4b, 9.1.4-5a, 9.1.4-5b below; otherwise, $M_p^{(L)}$ is the number of EPDCCH candidates to monitor at aggregation level L in EPDCCH-PRB-set p for the serving cell indicated by $n_{CI}$. If a mobile device is configured with higher layer parameter pdcch-candidateReductions for a specific search space at aggregation level L in EPDCCH-PRB-set p for a serving cell, the corresponding number of EPDCCH candidates is given by $M_p^{(L)}$=round(a×$M_{p,full}^{(L)}$), where the value of a is determined according to Table 9.1.1-2 and $M_{p,full}^{(L)}$, is determined according to Tables 9.1.4-1a to 9.1.4-5b by replacing $M_p^{(L)}$ with $M_{p,full}^{(L)}$. If a mobile device is configured with higher layer parameter cif-InSchedulingCell-r13, the carrier indicator field value corresponds to cif-InSchedulingCell-r13, otherwise the carrier indicator field value is the same as ServCellIndex given in 3GPP TS36.331, "Evolved Universal Terrestrial Radio Access (E-UTRA); Radio Resource Control (RRC) protocol specification." A mobile device is not expected to monitor an EPDCCH candidate, if an ECCE corresponding to that EPDCCH candidate is mapped to a PRB pair that overlaps in frequency with a transmission of either PBCH or primary or secondary synchronization signals in the same subframe. If a mobile device is configured with two EPDCCH-PRB-sets with the same $n_{ID,i}^{EPDCCH}$ value (where $n_{ID,i}^{EPDCCH}$ is defined in subclause 6.10.3A.1 in 3GPP TS 36.211: "Evolved Universal Terrestrial Radio Access (E-UTRA); Physical channels and modulation."), if the mobile device receives an EPDCCH candidate with a given DCI payload size corresponding to one of the EPDCCH-PRB-sets and mapped only to a given set of REs (as described in subclause 6.8A.5 in 3GPP TS 36.211: "Evolved Universal Terrestrial Radio Access (E-UTRA); Physical channels and modulation."), and if the mobile device is also configured to monitor an EPDCCH candidate with the same DCI payload size and corresponding to the other EPDCCH-PRB-set and which is mapped only to the same set of REs, and if the number of the first ECCE of the received EPDCCH candidate is used for determining PUCCH resource for HARQ-ACK transmission (as described in subclause 10.1.2 and subclause 10.1.3), the number of the first ECCE shall be determined based on EPDCCH-PRB-set p=0.

The variable $Y_{p,k}$ is defined by $$Y_{p,k}=(A_p\cdot Y_{p,k-1})\bmod D$$

where $Y_{p,-1}=n_{RNTI}\neq 0$, $A_0$=39827, $A_1$=39829, D=65537 and k=$\lfloor n_s/2\rfloor$, $n_s$ is the slot number within a radio frame. The RNTI value used for $n_{RNTI}$ is defined in subclause 7.1 in downlink and subclause 8 in uplink. The DCI formats that the mobile device shall monitor depend on the configured transmission mode per each serving cell as defined in subclause 7.1.

If a mobile device is configured with higher layer parameter skipMonitoringDCI-format0-1A for a serving cell, the mobile device is not required to monitor the EPDCCH with DCI Format 0/1A in the mobile device specific search space for that serving cell. If a serving cell is a LAA Scell, and if the higher layer parameter subframeStartPosition for the Scell indicates 's07'— the mobile device monitors EPDCCH UE-specific search space candidates on the Scell assuming they start in both the first slot and the second slot of a subframe. The aggregation levels defining the search spaces and the number of monitored EPDCCH candidates is given as follows: For a mobile device configured with only one EPDCCH-PRB-set for distributed transmission, the aggregation levels defining the search spaces and the number of monitored EPDCCH candidates are listed in Table 9.1.4-1a, Table 9.1.4-1b. For a mobile device configured with only one EPDCCH-PRB-set for localized transmission, the aggregation levels defining the search spaces and the number of monitored EPDCCH candidates are listed in Table 9.1.4-2a, Table 9.1.4-2b. For a mobile device configured with two EPDCCH-PRB-sets for distributed transmission, the aggregation levels defining the search spaces and the number of monitored EPDCCH candidates are listed in Table 9.1.4-3a, 9.1.4-3b. For a mobile device configured with two EPDCCH-PRB-sets for localized transmission, the aggregation levels defining the search spaces and the number of monitored EPDCCH candidates are listed in Table 9.1.4-4a, 9.4.4-4b. For a mobile device configured with one EPDCCH-PRB-set for distributed transmission, and one EPDCCH-PRB-set for localized transmission, the aggregation levels defining the search spaces and the number of monitored EPDCCH candidates are listed in Table 9.1.4-5a, 9.1.4-5b. If the mobile device is not configured with a carrier indicator field for the serving cell on which EPDCCH is monitored, $\hat{N}_{RB}^{DL}=N_{RB}^{DL}$ of the serving cell on which EPDCCH is monitored. If the mobile device is configured with a carrier indicator field for the serving cell on which EPDCCH is monitored, $\hat{N}_{RB}^{DL}=N_{RB}^{DL}$ of the serving cell indicated by $n_{CI}$.

Section 7.1 UE procedure for receiving the physical downlink shared channel of 3GPP TS 36.213 v13.1.1, "E-UTRA Physical layer procedures (Release 13)" states:

Except the subframes indicated by the higher layer parameter mbsfn-SubframeConfigList or by mbsfn-SubframeConfigList-v12x0 or by laa-SCellSubframeConfig of serving cell c, a mobile device shall: upon detection of a PDCCH of the serving cell with DCI format 1, 1A, 1B, 1C, 1D, 2, 2A, 2B, 2C, or 2D intended for the mobile device in a subframe, or upon detection of an EPDCCH of the serving cell with DCI format 1, 1A, 1B, 1D, 2, 2A, 2B, 2C, or 2D intended for the mobile device in a subframe decode the corresponding PDSCH in the same subframe with the restriction of the number of transport blocks defined in the higher layers. If a mobile device is configured by higher layers to decode PDCCH with CRC scrambled by the SI-RNTI, the mobile device shall decode the PDCCH and the corresponding PDSCH according to any of the combinations defined in Table 7.1-1. The scrambling initialization of PDSCH corresponding to these PDCCHs is by SI-RNTI.

TABLE 7.1-1

PDCCH and PDSCH configured by SI-RNTI

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2). |
| DCI format 1A | Common | If the number of PBCH antenna ports is one, Single-antenna port, port 0 is used (see subclause 7.1.1), otherwise Transmit diversity (see subclause 7.1.2). |

If a mobile device is configured by higher layers to decode PDCCH with CRC scrambled by the P-RNTI, the mobile device shall decode the PDCCH and the corresponding PDSCH according to any of the combinations defined in Table 7.1-2.

The scrambling initialization of PDSCH corresponding to these PDCCHs is by P-RNTI. If a mobile device is configured by higher layers to decode MPDCCH with CRC scrambled by the P-RNTI, the mobile device shall decode the MPDCCH and any corresponding PDSCH according to any of the combinations defined in Table 7.1-2A.

The scrambling initialization of PDSCH corresponding to these MPDCCHs is by P-RNTI.

The mobile device is not required to monitor PDCCH with CRC scrambled by the P-RNTI on the PSCell.

TABLE 7.1-2

PDCCH and PDSCH configured by P-RNTI

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2) |
| DCI format 1A | Common | If the number of PBCH antenna ports is one, Single-antenna port, port 0 is used (see subclause 7.1.1), otherwise Transmit diversity (see subclause 7.1.2) |

If a mobile device is configured by higher layers to decode PDCCH with CRC scrambled by the RA-RNTI, the mobile device shall decode the PDCCH and the corresponding PDSCH according to any of the combinations defined in Table 7.1-3. The scrambling initialization of PDSCH corresponding to these PDCCHs is by RA-RNTI.

If a mobile device is configured by higher layers to decode MPDCCH with CRC scrambled by the RA-RNTI, the mobile device shall decode the MPDCCH and the corresponding PDSCH according to any of the combinations defined in Table 7.1-3A. The scrambling initialization of PDSCH corresponding to these MPDCCHs is by RA-RNTI.

When RA-RNTI and either C-RNTI or SPS C-RNTI are assigned in the same subframe, the mobile device is not required to decode a PDSCH on the primary cell indicated by a PDCCH/EPDCCH with a CRC scrambled by C-RNTI or SPS C-RNTI.

TABLE 7.1-3

PDCCH and PDSCH configured by RA-RNTI

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2) |
| DCI format 1A | Common | If the number of PBCH antenna ports is one, Single-antenna port, port 0 is used (see subclause 7.1.1), otherwise Transmit diversity (see subclause 7.1.2) |

The mobile device is semi-statically configured via higher layer signaling to receive PDSCH data transmissions signaled via PDCCH/EPDCCH according to one of the transmission modes, denoted mode 1 to mode 10.

If a mobile device is configured by higher layers to decode PDCCH with CRC scrambled by the C-RNTI, the mobile device shall decode the PDCCH and any corresponding PDSCH according to the respective combinations defined in Table 7.1-5. The scrambling initialization of PDSCH corresponding to these PDCCHs is by C-RNTI.

If a mobile device is configured by higher layers to decode EPDCCH with CRC scrambled by the C-RNTI, the mobile device shall decode the EPDCCH and any corresponding PDSCH according to the respective combinations defined in Table 7.1-5A. The scrambling initialization of PDSCH corresponding to these EPDCCHs is by C-RNTI.

When a mobile device is configured in transmission mode 9 or 10, in the downlink subframes indicated by the higher layer parameter mbsfn-SubframeConfigList or by mbsfn-SubframeConfigList-v12x0 or by laa-SCell-SubframeConfig of serving cell c except in subframes for the serving cell: indicated by higher layers to decode PMCH or, configured by higher layers to be part of a positioning reference signal occasion and the positioning reference signal occasion is only configured within MBSFN subframes and the cyclic prefix length used in subframe #0 is normal cyclic prefix, the mobile device shall upon detection of a PDCCH with CRC scrambled by the C-RNTI with DCI format 1A/2C/2D intended for the mobile device or, upon detection of an EPDCCH with CRC scrambled by the C-RNTI with DCI format 1A/2C/2D intended for the mobile device, decode the corresponding PDSCH in the same subframe.

TABLE 7.1-5

PDCCH and PDSCH configured by C-RNTI

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
|  | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
|  | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
|  | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
|  | DCI format 2 | UE specific by C-RNTI | Closed-loop spatial multiplexing (see subclause 7.1.4)or Transmit diversity (see subclause 7.1.2) |
| Mode 5 | DCI format 1A | Common and UE specific by C-RNTI | Transmit diversity (see subclause 7.1.2) |
|  | DCI format 1D | UE specific by C-RNTI | Multi-user MIIVIO (see subclause 7.1.5) |
| Mode 6 | DCI format 1A | Common and UE specific by C-RNTI | Transmit diversity (see subclause 7.1.2) |
|  | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 2B | UE specific by C-RNTI | Dual layer transmission, port 7 and 8 (see subclause 7.1.5A) or single-antenna port, port 7 or 8 (see subclause 7.1.1) |

Figure 13:
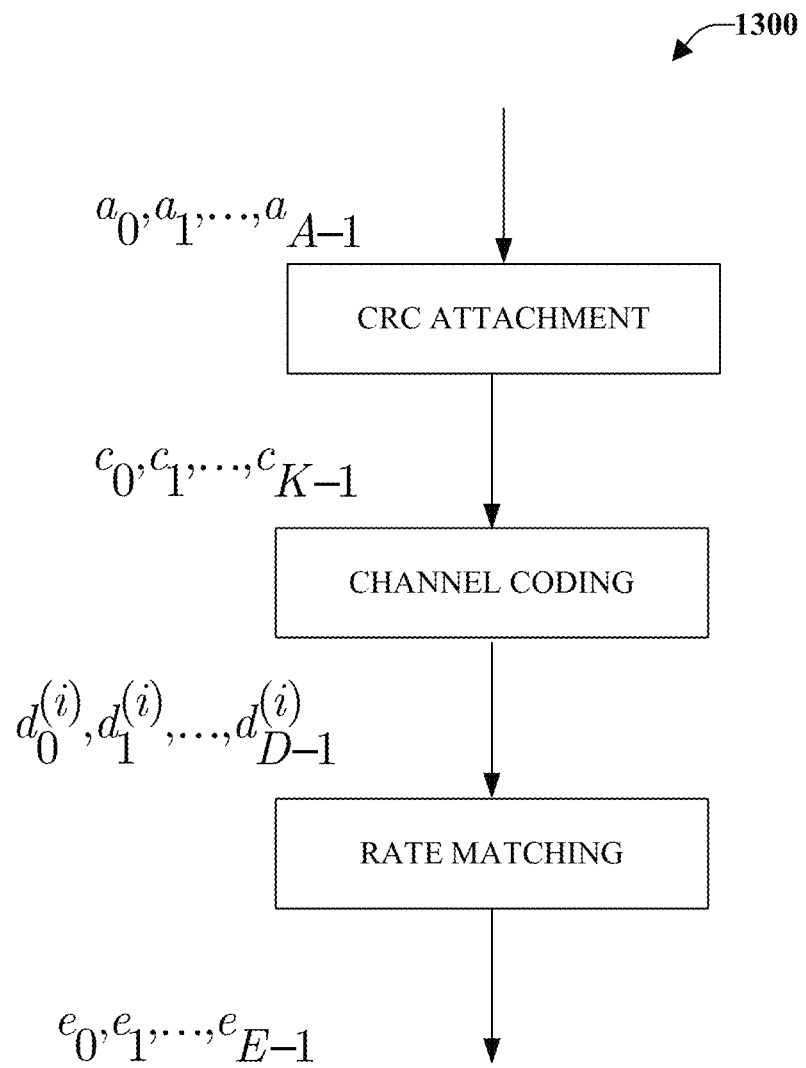
FIG. 13 illustrates a block diagram showing processing for one DCI intervals in accordance with one or more embodiments described herein.

As stated in Section 5.3.3: Downlink control information of 3GPP TS 36.212 V13.1.0, "E-UTRA Multiplexing and channel coding (Release 13)":

A DCI transports downlink, uplink or sidelink scheduling information, requests for aperiodic CQI reports, LAA common information, notifications of MCCH change (as discussed in 3GPP TS 36.101: "Evolved Universal Terrestrial Radio Access (E-UTRA); User Equipment (UE) radio transmission and reception") or uplink power control commands for one cell and one RNTI. The RNTI is implicitly encoded in the CRC. FIG. 5.3.3-1 shows the processing structure for one DCI. The following coding steps can be identified: Information element multiplexing; CRC attachment; Channel coding; and Rate matching. The coding steps for DCI are shown in FIG. 13 (which is also referred to as FIG. 5.3.3-1 herein), which illustrates a block diagram 1300 showing processing for one DCI.

5.3.3.2 CRC attachment

Error detection is provided on DCI transmissions through a Cyclic Redundancy Check (CRC). The entire payload is used to calculate the CRC parity bits. Denote the bits of the payload by $a_0, a_1, a_2, a_3, \ldots, a_{A-1}$, and the parity bits by $p_0, p_1, p_2, p_3, \ldots, p_{L-1}$. A is the payload size and L is the number of parity bits. The parity bits are computed and attached according to section 5.1.1 setting L to 16 bits, resulting in the sequence $b_0, b_1, b_2, b_3, \ldots, b_{B-1}$, where B=A+L. In the case where closed-loop mobile device transmit antenna selection is not configured or applicable, after attachment, the CRC parity bits are scrambled with the corresponding RNTI $x_{mti,0}, x_{mti,1}, \ldots, x_{mti,15}$, where $x_{mit,0}$ corresponds to the MSB of the RNTI, to form the sequence of bits $c_0, c_1, c_2, c_3, \ldots, c_{B-1}$. The relation between $c_k$ and $b_k$ is:

$$c_k = b_k \text{ for } k=0,1,2,\ldots,A-1$$

$$c_k = (b_k + x_{mti,k-A}) \bmod 2 \text{ for } k=A, A+1, A+2, \ldots, A+15.$$

In the case where closed-loop mobile device transmit antenna selection is configured and applicable, after attachment, the CRC parity bits with DCI format 0 are scrambled with the antenna selection mask $x_{AS,0}, x_{AS,1}, \ldots, x_{AS,15}$ as indicated in Table 5.3.3.2-1 and the corresponding RNTI $x_{mti,0}, x_{mti,1}, \ldots, x_{mti,15}$ to form the sequence of bits $c_0, c_1, c_2, c_3, \ldots, c_{B-1}$. The relation between $c_k$ and $b_k$ is:

$$c_k = b_k \text{ for } k=0,1,2,\ldots,A-1$$

$$c_k = (b_k + x_{mti,k-A} + X_{AS,k-A}) \bmod 2 \text{ for } k=A, A+1, A+2, \ldots, A+15.$$

TABLE 5.3.3.2-1 mobile device transmit antenna selection mask.

| UE transmit antenna selection | Antenna selection mask $<x_{AS,0}, x_{AS,1}, \ldots, x_{AS,15}>$ |
|---|---|
| UE port 0 | <0, 0, 0, 0, 0, 0, 0, 0, 0, 0, 0, 0, 0, 0, 0, 0> |
| UE port 1 | <0, 0, 0, 0, 0, 0, 0, 0, 0, 0, 0, 0, 0, 0, 0, 1> |

According to the various aspects provided herein, the timing relationship between control channel and data channel can be specified in LTE. When the mobile device receives a control channel in a subframe n for scheduling downlink data, the associated downlink data could be located in the data region of the same subframe n. Further, the mobile device can transmit a corresponding HARQ feedback in a specific subframe after the reception (e.g. in subframe n+4). For the downlink data reception, asynchronous HARQ can be applied (e.g., the retransmission timing is not tied to the feedback timing). Therefore, HARQ process ID could be required for the DL data scheduling. For the UL data scheduling, when the mobile device receives a control channel in a subframe n for scheduling uplink data, the associated downlink data would located in subframe n+4. For UL data, there is no control region as the control/data are multiplexed in frequency domain and UL data can occupy all symbols in a subframe within the allocated resource, except for those may be occupied by reference signal (RS). Further, it would expect corresponding HARQ feedback or a retransmission grant in a specific subframe after the reception, e.g. in subframe n+4. For the uplink data transmission, synchronous HARQ is applied (e.g., the retransmission timing is tied to the feedback timing. Therefore, HARQ process ID is not required for the UL data scheduling.

More detail timing can be found in below quotation from 3GPP TS 36.213 v13.1.1, "E-UTRA Physical layer procedures (Release 13)," which states:

7.1 mobile device procedure for receiving the physical downlink shared channel

Except the subframes indicated by the higher layer parameter mbsfn-SubframeConfigList or by mbsfn-SubframeConfigList-v12x0 or by laa-SCellSubframeConfig of serving cell c, a mobile device shall: upon detection of a PDCCH of the serving cell with DCI format 1, 1A, 1B, 1C, 1D, 2, 2A, 2B, 2C, or 2D intended for the mobile device in a subframe, or, upon detection of an EPDCCH of the serving cell with DCI format 1, 1A, 1B, 1D, 2, 2A, 2B, 2C, or 2D intended for the mobile device in a subframe; decode the corresponding PDSCH in the same subframe with the restriction of the number of transport blocks defined in the higher layers.

Section 8.0 UE procedure for transmitting the physical uplink shared channel of 3GPP TS 36.213 v13.1.1, "E-UTRA Physical layer procedures (Release 13)" states:

The term "UL/DL configuration" in this subclause refers to the higher layer parameter subframeAssignment unless specified otherwise. For FDD and normal HARQ operation, the mobile device shall upon detection on a given serving cell of a PDCCH/EPDCCH with DCI format 0/4 and/or a PHICH transmission in subframe n intended for the mobile device, adjust the corresponding PUSCH transmission in subframe n+4 according to the PDCCH/EPDCCH and PHICH information. For FDD-TDD and normal HARQ operation and a PUSCH for serving cell c with frame structure type 1, the mobile device shall upon detection of a PDCCH/EPDCCH with DCI format 0/4 and/or a PHICH transmission in subframe n intended for the mobile device, adjust the corresponding PUSCH transmission for serving cell c in subframe n+4 according to the PDCCH/EPDCCH and PHICH information . . . . For TDD UL/DL configurations 1-6 and normal HARQ operation, the mobile device shall upon detection of a PDCCH/EPDCCH with uplink DCI format and/or a PHICH transmission in subframe n intended for the mobile device, adjust the corresponding PUSCH transmission in subframe n+k, with k given in Table 8-2, according to the PDCCH/EPDCCH and PHICH information. For TDD UL/DL configuration 0 and normal HARQ operation the mobile device shall upon detection of a PDCCH/EPDCCH with uplink DCI format and/or a PHICH transmission in subframe n intended for the mobile device, adjust the corresponding PUSCH transmission in subframe n+k if the MSB of the UL index in the PDCCH/EPDCCH with uplink DCI format is set to 1 or PHICH is received in subframe n=0 or 5 in the resource corresponding to $I_{PHICH}=0$, as defined in subclause 9.1.2, with k given in Table 8-2. If, for TDD UL/DL configuration 0 and normal HARQ operation, the LSB of the UL index in the DCI format 0/4 is set to 1 in subframe n or a PHICH is received in subframe n=0 or 5 in the resource corresponding to $I_{PHICH}=1$, as defined in subclause 9.1.2, or PHICH is received in subframe n=1 or 6, the mobile device shall adjust the corresponding PUSCH transmission in subframe n+7. If, for TDD UL/DL configuration 0, both the MSB and LSB of the UL index in the PDCCH/EPDCCH with uplink DCI format are set in subframe n, the mobile device shall adjust the corresponding PUSCH transmission in both subframes n+k and n+7, with k given in Table 8-2. For TDD UL/DL configurations 1 and 6 and subframe bundling operation, the mobile device shall upon detection of a PDCCH/EPDCCH with DCI format 0 in subframe n intended for the mobile device, and/or a PHICH transmission intended for the mobile device in subframe n−1 with l given in Table 8-2a, adjust the corresponding first PUSCH transmission in the bundle in subframe n+k, with k given in Table 8-2, according to the PDCCH/EPDCCH and PHICH information. For TDD UL/DL configuration 0 and subframe bundling operation, the mobile device shall upon detection of a PDCCH/EPDCCH with DCI format 0 in subframe n intended for the mobile device, and/or a PHICH transmission intended for the mobile device in subframe n−1 with l given in Table 8-2a, adjust the corresponding first PUSCH transmission in the bundle in subframe n+k, if the MSB of the UL index in the DCI format 0 is set to 1 or if $I_{PHICH}=0$, as defined in subclause 9.1.2, with k given in Table 8-2, according to the PDCCH/EPDCCH and PHICH information. If, for TDD UL/DL configuration 0 and subframe bundling operation, the LSB of the UL index in the PDCCH/EPDCCH with DCI format 0 is set to 1 in subframe n or if $I_{PHICH}=1$, as defined in subclause 9.1.2, the mobile device shall adjust the corresponding first PUSCH transmission in the bundle in subframe n+7, according to the PDCCH/EPDCCH and PHICH information.

TABLE 8-2

| TDD UL/DL | k for TDD configurations 0-6 | | | | | | | | | |
|---|---|---|---|---|---|---|---|---|---|---|
| | subframe number n | | | | | | | | | |
| Configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | 4 | | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

TABLE 8-2a 1 for TDD configurations 0, 1 and 6

| TDDUL/DL Configuration | 0 | 1 | 2 | 3 | 4 | 5 | 6 | 7 | 8 | 9 |
|---|---|---|---|---|---|---|---|---|---|---|
| 0 |   | 9 | 6 |   |   |   | 9 | 6 |   |   |
| 1 |   |   | 2 |   |   | 3 |   | 2 |   | 3 |
| 6 |   | 5 | 5 |   |   |   | 6 | 6 |   | 8 |

TABLE 9.1.2-1

$k_{PHICH}$ for TDD

| TDD UL/DL Configuration | 0 | 1 | 2 | 3 | 4 | 5 | 6 | 7 | 8 | 9 |
|---|---|---|---|---|---|---|---|---|---|---|
| 0 |   |   | 4 | 7 | 6 |   |   | 4 | 7 | 6 |
| 1 |   |   | 4 | 6 |   |   |   | 4 | 6 |   |
| 2 |   |   | 6 |   |   |   |   | 6 |   |   |
| 3 |   |   | 6 | 6 | 6 |   |   |   |   |   |
| 4 |   |   | 6 | 6 |   |   |   |   |   |   |
| 5 |   |   | 6 |   |   |   |   |   |   |   |
| 6 |   |   | 4 | 6 | 6 |   |   | 4 | 7 |   |

9.1.2 PHICH assignment procedure

If a mobile device is not configured with multiple TAGs, or if a mobile device is configured with multiple TAGs and PUSCH transmissions scheduled from serving cell c in subframe n are not scheduled by a Random Access Response Grant corresponding to a random access preamble transmission for a secondary cell For PUSCH transmissions scheduled from serving cell c in subframe n, the mobile device shall determine the corresponding PHICH resource of serving cell c in subframe $n+k_{PHICH}$, where $k_{PHICH}$ is always 4 for FDD.

$k_{PHICH}$ is 6 for FDD-TDD and serving cell c frame structure type 2 and the PUSCH transmission is for another serving cell with frame structure type 1.

$k_{PHICH}$ is 4 for FDD-TDD and serving cell c frame structure type 1 and the PUSCH transmission is for a serving cell with frame structure type 1.

$k_{PHICH}$ is given in table 9.1.2-1 for FDD-TDD and serving cell c frame structure type 1 and the PUSCH transmission is for another serving cell with frame structure type 2.

For TDD, if the mobile device is not configured with EIMTA-Main ConfigServCell-r12 for any serving cell and, if the mobile device is configured with one serving cell, or if the mobile device is configured with more than one serving cell and the TDD UL/DL configuration of all the configured serving cells is the same, for PUSCH transmissions scheduled from serving cell c in subframe n, the mobile device shall determine the corresponding PHICH resource of serving cell c in subframe $n+k_{PHICH}$, where $k_{PHICH}$ is given in table 9.1.2-1.

For TDD, if the mobile device is configured with more than one serving cell and the TDD UL/DL configuration of at least two configured serving cells is not the same, or if the mobile device is configured with EIMTA-Main ConfigServCell-r12 for at least one serving cell, or for FDD-TDD and serving cell c frame structure type 2, for PUSCH transmissions scheduled from serving cell c in subframe n, the mobile device shall determine the corresponding PHICH resource of serving cell c in subframe $n+k_{PHICH}$, where $k_{PHICH}$ is given in table 9.1.2-1, where the "TDD UL/DL Configuration" in the rest of this subclause refers to the UL-reference UL/DL configuration (defined in subclause 8.0) of the serving cell corresponding to the PUSCH transmission.

10.2 Uplink HARQ-ACK timing

For TDD or for FDD-TDD and primary cell frame structure type 2 or for FDD-TDD and primary cell frame structure type 1, if a mobile device configured with EIMTA-MainConfigServCell-r12 for a serving cell, "UL/DL configuration" of the serving cell in subclause 10.2 refers to the UL/DL configuration given by the parameter eimta-HARQ-ReferenceConfig-r12 for the serving cell unless specified otherwise. For a non-BL/CE mobile device, for FDD or for FDD-TDD and primary cell frame structure type 1, the mobile device shall upon detection of a PDSCH transmission in subframe n−4 intended for the mobile device and for which an HARQ-ACK shall be provided, transmit the HARQ-ACK response in subframe n. If HARQ-ACK repetition is enabled, upon detection of a PDSCH transmission in subframe n−4 intended for the mobile device and for which HARQ-ACK response shall be provided, and if the mobile device is not repeating the transmission of any HARQ-ACK in subframe n corresponding to a PDSCH transmission in subframes $n-N_{ANRep}-3, \ldots, n-5$, the UE: shall transmit only the HARQ-ACK response (corresponding to the detected PDSCH transmission in subframe n−4) on PUCCH in subframes $n, n+1, \ldots, n+N_{ANRep}-1$; shall not transmit any other signal/channel in subframes $n, n+1, \ldots, n+N_{ANRep}-1$; and shall not transmit any HARQ-ACK response repetitions corresponding to any detected PDSCH transmission in subframes $n-3, n+N_{ANRep}-5$.

Furthermore it is agreed in 3GPP to study a new type of control signal, sPDCCH to accommodate the new TTI length:

Agreement:

sPDCCH (PDCCH for short TTI) needs to be introduced for short TTI. Each short TTI on DL may contain sPDCCH decoding candidates.

Conclusions:

A maximum number of BDs will be defined for sPDCCH in USS. In case 2-level DCI is adopted, any DCI for sTTI scheduling carried on PDCCH can be taken into account in the maximum total number of BDs. FFS whether the maximum number is dependent on the sTTI length. FFS whether the maximum number of blind decodes for (E)PDCCH is reduced in subframes in which the mobile device is expected to perform blind decodes for sPDCCH. FFS whether a mobile device can be expected to monitor both EPDCCH and sPDCCH in the same subframe. FFS whether the maximum number of BDs on PDCCH is changed from the legacy number if DCI on PDCCH is for sTTI scheduling.

Besides the timing domain structure, two-level DCI structure is studied due to the increase of control overhead under shortened TTI. So instead of carrying all the information required for one TTI data reception as done before, some control information in a DCI which may not vary from time to time can be common for multiple TTI would signaled once but not in every TTI. The mobile device would assume the same content applied for multiple TTIs. This type of DCI is also called slow DCI. On the other hand, there would still be some information which would vary between TTIs would be signal for each TTI, which is known as fast DCI. For receiving data in one TTI, mobile device may need to combine/concatenate slow DCI and fast DCI to obtain the required information.

Conclusion for Study Till RAN1#85:

Two-level DCI can be studied for sTTI scheduling, whereby: (1) DCI for sTTI scheduling can be divided into two types: "slow DCI": DCI content which applies to more than 1 sTTI is carried on either legacy PDCCH, or sPDCCH transmitted not more than once per subframe; FFS whether "slow DCI" is UE-specific or common for multiple UE; "fast DCI": DCI content which applies to a specific sTTI is carried on sPDCCH; For a sPDSCH in a given sTTI, the scheduling information is obtained from either: a combination of slow DCI and fast DCI, or fast DCI only, overriding the slow DCI for that sTTI. Compare with single-level DCI carried on one sPDCCH or one legacy PDCCH; it is not precluded to consider schemes in which the slow DCI also includes some resource allocation information for the sPDCCH. Methods for reducing the overhead of single-level DCI can also be studied; Single-level DCI multi-sTTI scheduling for a variable number of sTTIs can be included. Aim to reduce the number of schemes under consideration at RAN1#85. An example of content of slow DCI and fast DCI is given below R1-163068, "DL channel design for shortened TTI", Qualcomm Incorporated. Some examples of new TTI structure with different TTI length can be found in R1-163068, "DL channel design for shortened TTI," Qualcomm Incorporated:

2-Stage DCI Design

Since the TTI is shorter, it is critical to limit the control overhead in the transmission. A 2-stage DCI design might help in this. In particular, a stage 0 DCI can carry slowly varying portion of the grant and a stage 1 DCI can carry fast varying portion of the grant.

As an example, stage 0 DCI may carry the following information fields: UL/DL grant identifier, similar to the 1-bit differentiator for DCI formats 0/1A; Base MCS, which indicates a set of MCS values for rate adaptation to a large extent; TPC; Stage 1 DCI scheduling information, e.g., the aggregation level(s) and/or the decoding candidate(s) of a given aggregation level, in order to reduce the number of blind decodes for stage 1 DCI.

On the other hand, Stage 1 DCI may carry the following information fields: HARQ process ID; Resource allocation; sPDSCH rate matching indication, which can alleviate potential resource fragmentation due to sPDCCH or legacy traffic; Precoding Info and antenna ports information; NDI; Additional MCS information, which can provide updated MCS information with respect to that of stage 0 DCI; and UL RS related information, which can provide indication on UL channel structure particularly for sPUCCH.

The transmission of stage 0 DCI can be on a per need basis, while the transmission of stage 1 DCI may accompany with each sPDSCH. With the 2-stage DCI design, it is expected that DL control overhead savings can be realized. It may help increase the coverage area of shortened TTI transmissions.

It is also discussed how to handle transmission with different TTI length:

Agreements:

A mobile device is expected to handle the following cases in the same carrier in a subframe Receiving legacy TTI non-unicast PDSCH (except for further study (FFS) for single cell point to multipoint (SC-PTM)) and short TTI unicast PDSCH. Receiving legacy TTI non-unicast PDSCH (except FFS for SC-PTM) and legacy TTI unicast PDSCH(s).

FFS Between:

Alternative 1: A mobile device is not expected to receive legacy TTI unicast PDSCH and short TTI unicast PDSCH simultaneously on one carrier; Alternative 2: If the mobile device is scheduled with legacy TTI unicast PDSCH and short TTI unicast PDSCH simultaneously on one carrier, then it may skip the decoding of one of them (FFS rules for determining which one). Alternative 3: A mobile device is expected to receive legacy TTI unicast PDSCH and short TTI unicast PDSCH simultaneously on one carrier. FFS mobile device behaviour in case of being scheduled with legacy TTI unicast PDSCH and short TTI unicast PDSCH simultaneously with legacy TTI non-unicast PDSCH (except FFS for SC-PTM) on the same carrier. A mobile device can be dynamically (with a subframe to subframe granularity) scheduled with legacy TTI unicast PDSCH and/or (depends on outcome of FFS above) short TTI PDSCH unicast.

Agreements:

A mobile device can be dynamically (with a subframe to subframe granularity) scheduled with PUSCH and/or sPUSCH. A mobile device is not expected to transmit PUSCH and short TTI sPUSCH simultaneously on the same REs, e.g., by superposition. FFS whether a mobile device may transmit PUSCH and short TTI sPUSCH in the same subframe on one carrier by puncturing PUSCH. FFS whether a mobile device may transmit PUSCH and short TTI sPUSCH in different PRBs on the same symbol(s). Dropping/prioritization rules (if any) are FFS.

In R2-162227, 3GPP TSG RAN WG2 #93b, "Discussion on Study Areas for URLLC in 5G New Radio Interface,", some relevant texts are quoted below.

3.1 New Frame Structure

User plane latency largely depends on frame structure, especially TTI length, so that 5G new RAT is expected to adopt new frame structure that includes short TTI. Although discussion on new frame structure design will be mainly conducted by RAN1, it is meaningful for RAN2 to consider its impact on layers 2 and 3.

Figure 14:
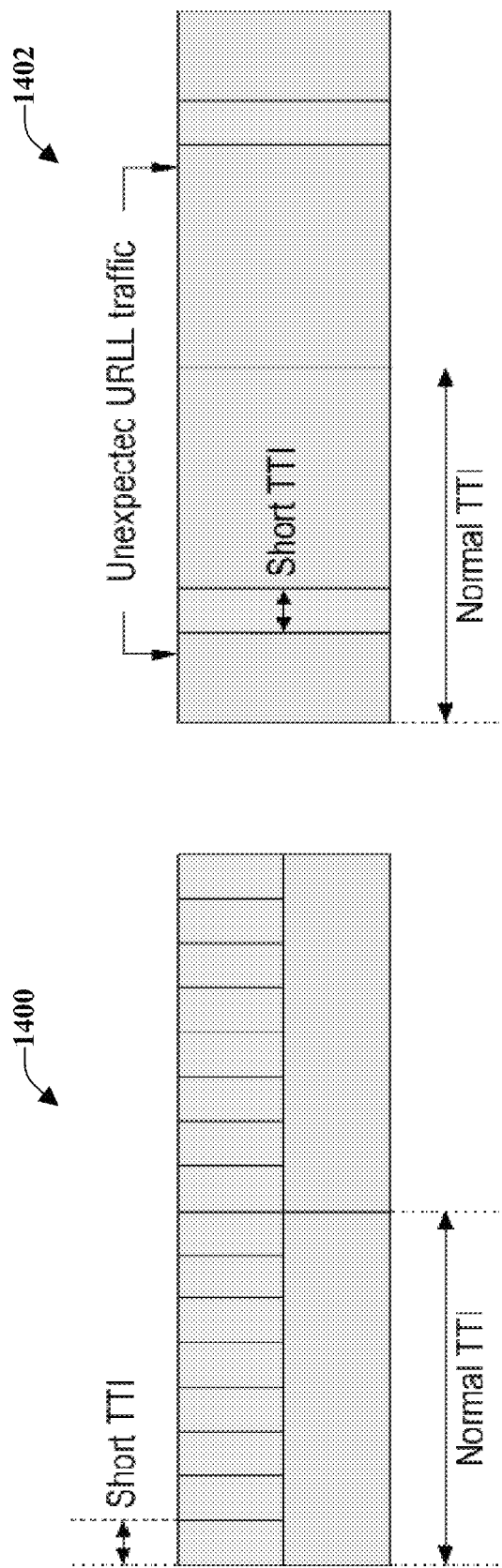
FIG. 14 illustrates frame structures with fixed short TTIs and frame structures with opportunistic short TTIs in accordance with one or more embodiments described herein.

Basically, multiplexing URLL traffic with normal (e.g., eMBB) traffic in the same carrier may provide better spectral resource utilization compared to allocating URLL traffic to the dedicated carrier. In addition, decreasing scheduling latency, which is defined as the time from when a data is generated to when it is scheduled, is necessary. From these perspectives, we can consider the following two frame structures as examples (as illustrated in FIG. 14). FIG. 14 is a frame structure with fixed short TTIs 1402 and opportunistic short TTIs 1404. FIG. 14 shows (a) the frame structure with fixed short TTIs and (b) that with opportunistic short TTIs. In the case (a), an eNB is always able to use not only normal TTIs but also short TTIs. Under the consideration of such a frame structure, it is required to study how to utilize always-existing short TTIs from RAN2 perspective.

In the case (b), an eNB typically uses the given resources as normal TTIs. Furthermore, short TTIs can be opportunistically allocated on top of the normal TTI whenever URLL traffic suddenly occurs. Note that the normal traffic carried on the normal TTI can be punctured (or not) during the short TTI. Due to the uncertainty of the existence of the URLL traffic, there can be several issues like how to schedule these opportunistic short TTIs.

Observation 1: It is necessary to study the impact of new frame structure with short TTI on RAN2 subject to the URLLC requirements in 5G.

The various aspects described above can be applied to or implemented in exemplary wireless communication systems and devices described below. In addition, the various aspects are described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, or some other modulation techniques.

Figure 15:
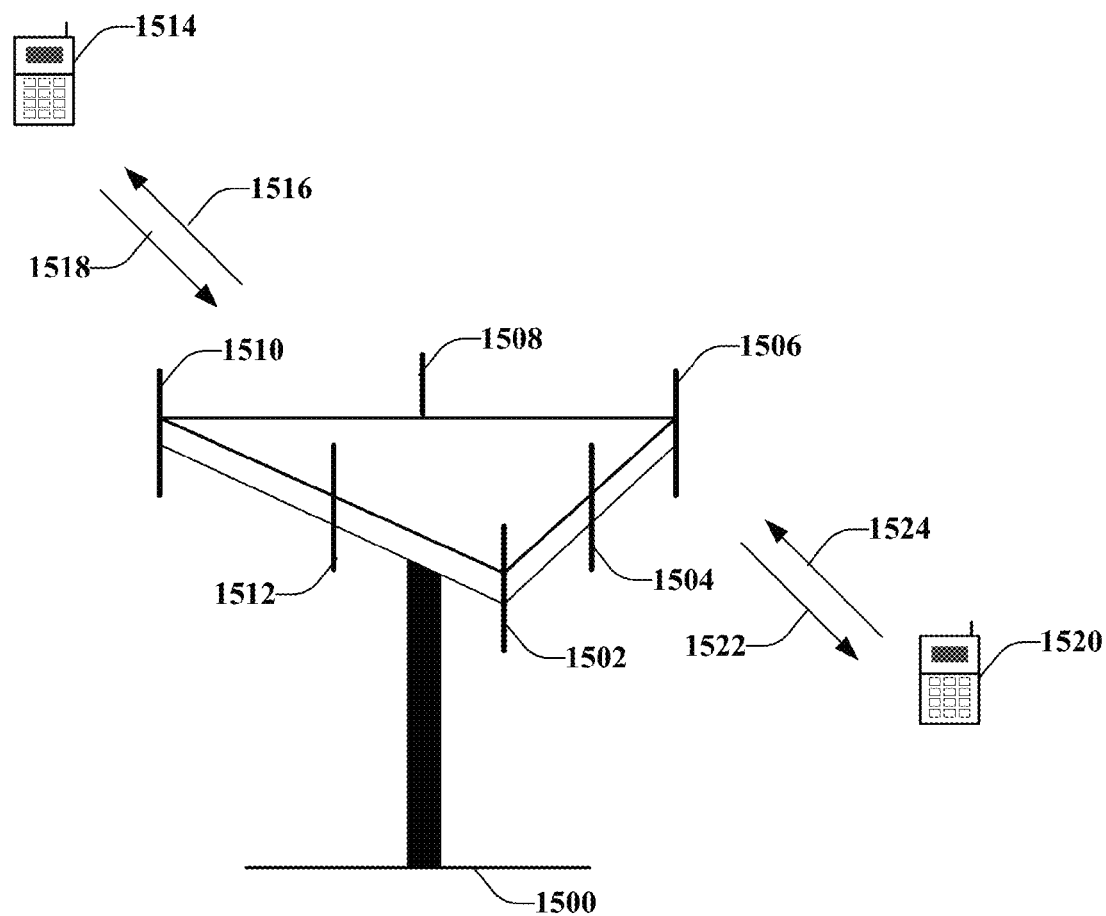
FIG. 15 illustrates a multiple access wireless communication system in accordance with one or more embodiments described herein.

FIG. 15 illustrates a multiple access wireless communication system in accordance with one or more embodiments described herein. An access network 1500 (AN) includes multiple antenna groups, one including 1502 and 1504, another including 1506 and 1508, and an additional including 1510 and 1512. In FIG. 15, only two antennas illustrated for each antenna group, however, more or fewer antennas may be utilized for each antenna group. Access terminal 1514 (AT) is in communication with antennas 1510 and 1512, where antennas 1510 and 1512 transmit information to access terminal 1514 over forward link 1516 (e.g., DL) and receive information from access terminal 1514 over reverse link 1518 (e.g., UL). Access terminal (AT) 1516 is in communication with antennas 1504 and 1506, where antennas 1504 and 1506 transmit information to access terminal (AT) 1520 over forward link 1522 (e.g., DL) and receive information from access terminal (AT) 1520 over reverse link 1524 (e.g., UL). In a FDD system, communication links 1516, 1518, 1522, and 1524 may use different frequency for communication. For example, forward link 1516 may use a different frequency than that used by reverse link 1518.

Each group of antennas and/or the area in which they are designed to communicate is often referred to as a sector of the access network. In the embodiment, antenna groups each are designed to communicate to access terminals in a sector of the areas covered by access network 1500.

In communication over forward links 1516 and 1520, the transmitting antennas of access network 1500 may utilize beamforming in order to improve the signal-to-noise ratio of forward links for the different access terminals 1514 and 1520. Also, an access network using beamforming to transmit to access terminals scattered randomly through its coverage normally causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 16:
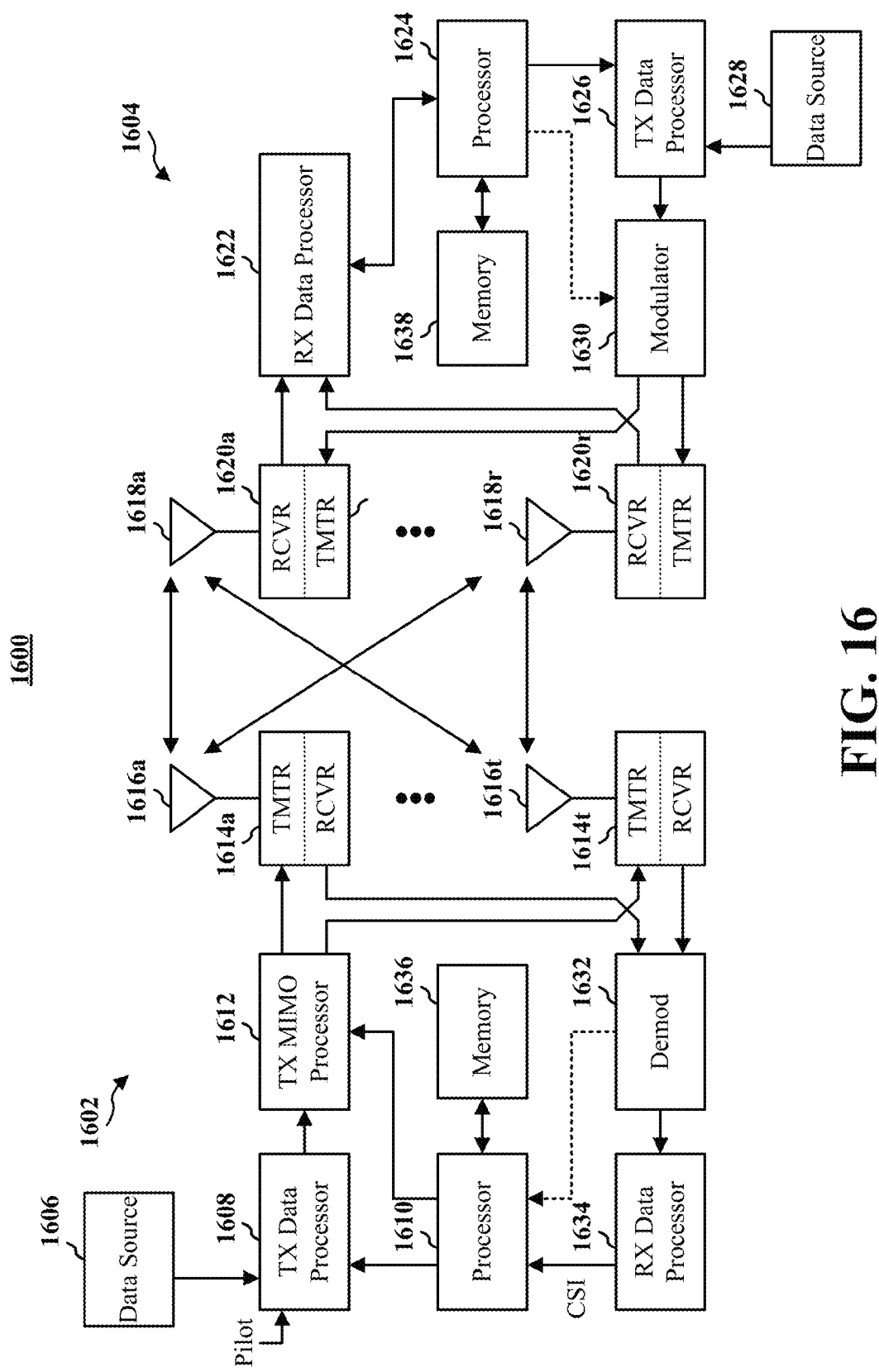
FIG. 16 illustrates a simplified block diagram of an embodiment a MIMO system that includes of a transmitter system and a receiver system in accordance with one or more embodiments described herein.

FIG. 16 illustrates a simplified block diagram of an embodiment a MIMO system 1600 that includes of a transmitter system 1602 (also known as the access network) and a receiver system 1604 (also known as access terminal (AT) or user equipment (UE)) in accordance with one or more embodiments described herein. At the transmitter system 1602, traffic data for a number of data streams is provided from a data source 1606 to a transmit (TX) data processor 1608.

In one embodiment, each data stream is transmitted over a respective transmit antenna. TX data processor 1608 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 1610.

The modulation symbols for all data streams are then provided to a TX MIMO processor 1612, which may further process the modulation symbols (e.g., for OFDM). TX MIMO processor 1612 then provides $N_T$ modulation symbol streams to $N_T$ transmitters (TMTR) 1614a through 1614t. In certain embodiments, TX MIMO processor 1612 applies beamforming weights to the symbols of the data streams and to the antenna from which the symbol is being transmitted.

Each transmitter 1614 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1614a through 1614t are then transmitted from $N_T$ antennas 1616a through 1616t, respectively.

At receiver system 1604, the transmitted modulated signals are received by $N_R$ antennas 1618a through 1618r and the received signal from each antenna 1618 is provided to a respective receiver (RCVR) 1620a through 1620r. Each receiver 1620 conditions (e.g., filters, amplifies, and downconverts) a respective received signal, digitizes the conditioned signal to provide samples, and further processes the samples to provide a corresponding "received" symbol stream.

An RX data processor 1622 then receives and processes the $N_R$ received symbol streams from $N_R$ receivers 1620 based on a particular receiver processing technique to provide $N_T$ "detected" symbol streams. The RX data processor 1622 then demodulates, deinterleaves, and decodes each detected symbol stream to recover the traffic data for the data stream. The processing by RX data processor 1622 is complementary to that performed by TX MIMO processor 1612 and TX data processor 1608 at transmitter system 1602.

A processor 1624 periodically determines which precoding matrix to use (discussed below). Processor 1624 formulates a reverse link message comprising a matrix index portion and a rank value portion.

The reverse link message may comprise various types of information regarding the communication link and/or the received data stream. The reverse link message is then processed by a TX data processor 1626, which also receives traffic data for a number of data streams from a data source 1628, modulated by a modulator 1630, conditioned by transmitters 1620a through 1620r, and transmitted back to transmitter system 1602.

At transmitter system 1602, the modulated signals from receiver system 1604 are received by antennas 1616, conditioned by receivers 1614, demodulated by a demodulator 1632, and processed by a RX data processor 1634 to extract the reserve link message transmitted by the receiver system 1604. Processor 1610 then determines which pre-coding matrix to use for determining the beamforming weights then processes the extracted message.

Memory 1636 can be used to temporarily store some buffered/computational data from 1632 or 1634 through processor 1630, store some buffed data from 1606, or store some specific program codes. Further, memory 1638 may be used to temporarily store some buffered/computational data from 1622 through processor 1624, store some buffed data from 1628, or store some specific program codes.

Figure 17:
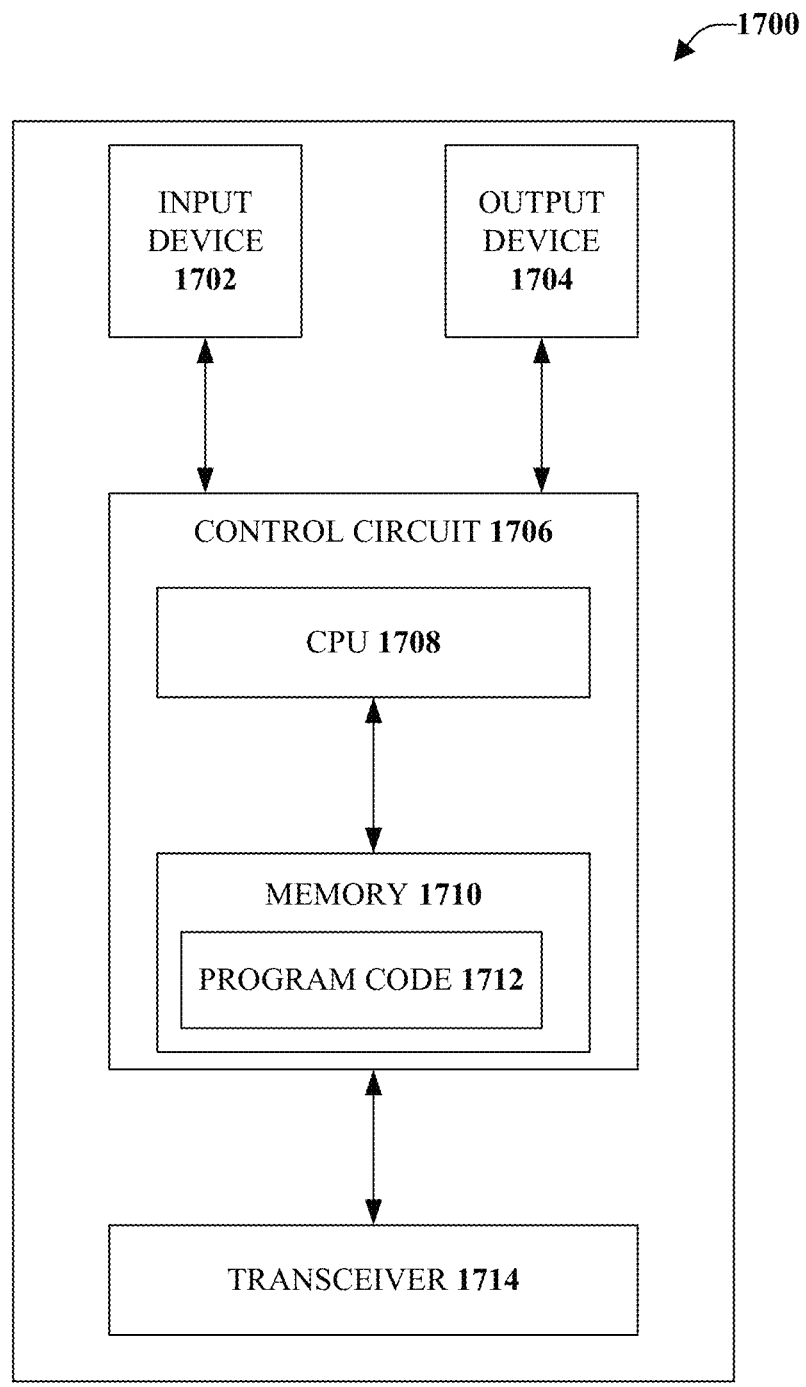
FIG. 17 illustrates an alternative simplified functional block diagram of a communication device in accordance with one or more embodiments described herein.

Turning to FIG. 17, illustrated is an alternative simplified functional block diagram of a communication device 1700 in accordance with one or more embodiments described herein. As illustrated in FIG. 17, the communication device 1700 in a wireless communication system can be utilized for realizing the Mobile devices (or ATs) 1514 and 1520 in FIG. 15, and the wireless communications system can be the LTE system. The communication device 1700 can include an input device 1702, an output device 1704, a control circuit 1706, a central processing unit (CPU) 1708, a memory 1710, a program code 1712, and a transceiver 1714. The control circuit 1706 executes the program code 1712 in the memory 1710 through the CPU 1708, thereby controlling an operation of the communications device 1700. The communications device 1700 can receive signals input by a user through the input device 1702, such as a keyboard or keypad, and can output images and sounds through the output device 1704, such as a monitor or speakers. The transceiver 1714 is used to receive and transmit wireless signals, delivering received signals to the control circuit 1706, and outputting signals generated by the control circuit 1706 wirelessly.

Figure 18:
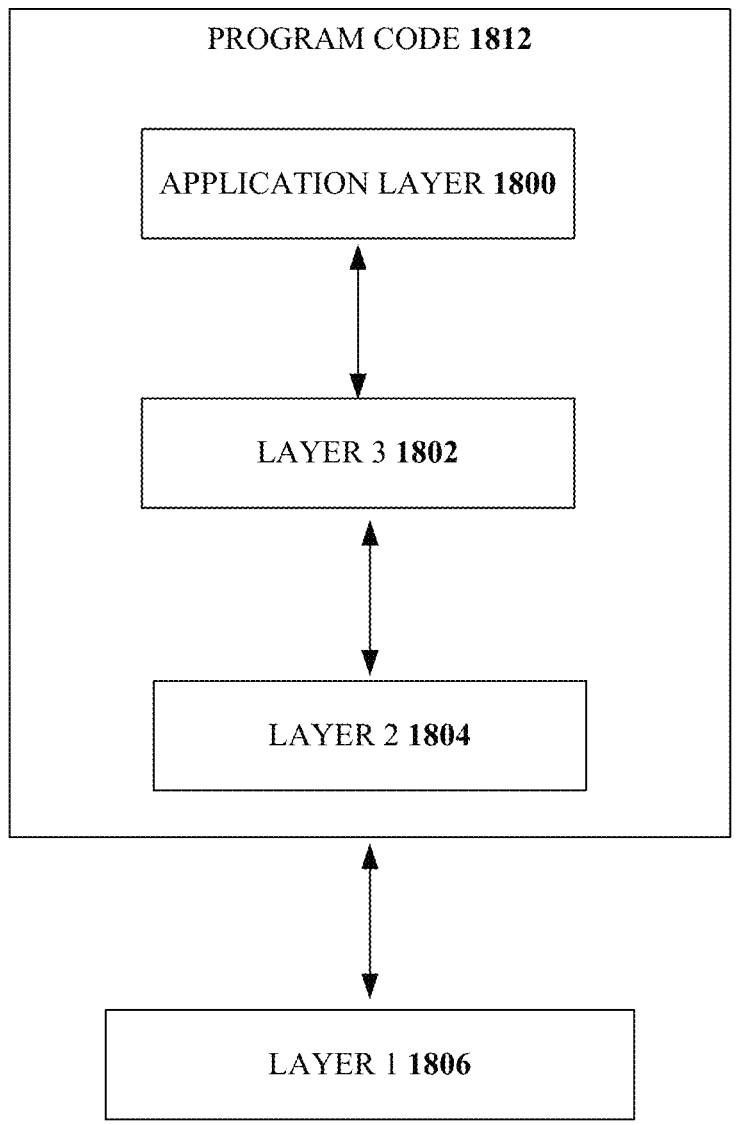
FIG. 18 is a simplified block diagram of the program code shown in FIG. 16 in accordance with one or more embodiments described herein.

FIG. 18 is a simplified block diagram of the program code 1712 shown in FIG. 17 in accordance with one or more embodiments described herein. In this embodiment, the program code 1712 includes an application layer 1800, a Layer 3 portion 1802, and a Layer 2 portion 1804, and is coupled to a Layer 1 portion 1806. The Layer 3 portion 1802 generally performs radio resource control. The Layer 2 portion 1804 generally performs link control. The Layer 1 portion 1806 generally performs physical connections.

For LTE or LTE-A system, the Layer 2 portion 1804 may include a Radio Link Control (RLC) layer and a Medium Access Control (MAC) layer. The Layer 3 portion 1802 may include a Radio Resource Control (RRC) layer.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects, a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not taken into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a device comprising a processor, a first priority level of a first uplink data transmission based on first downlink control information related to scheduling the first uplink data transmission via a first transmission time interval;
   determining, by the device, a second priority level of a second uplink data transmission based on second downlink control information related to scheduling the second uplink data transmission via a second transmission time interval, wherein the second uplink data transmission overlaps at least a symbol with the first uplink data transmission; and
   transmitting, by the device, the first uplink data transmission or the second uplink data transmission based on a prioritization determined based on the first priority level and the second priority level, wherein the prioritization includes a first length of the first transmission time interval and a second length of the second transmission time interval.

2. The method of claim 1, wherein the transmitting the first uplink data transmission or the second uplink data transmission comprises transmitting the second uplink data transmission to override a scheduling of the first uplink data transmission based on a determination that the second priority level is prioritized before the first priority level.

3. The method of claim 1, wherein the transmitting the first uplink data transmission or the second uplink data transmission comprises transmitting the first uplink data transmission to override a scheduling of the second uplink data transmission based on a determination that the first priority level is prioritized before the second priority level.

4. The method of claim 1, wherein the prioritization is based on the first length and the second length, and wherein the transmitting the first uplink data transmission or the second uplink data transmission comprises transmitting the second uplink data transmission to override a scheduling of the first uplink data transmission based on a determination that the second length is shorter than the first length.

5. The method of claim 4, wherein the device does not transmit the first uplink data transmission that is overridden by the second uplink data transmission.

6. The method of claim 1, wherein the prioritization is based on the first length and the second length, and wherein the transmitting the first uplink data transmission or the second uplink data transmission comprises transmitting the first uplink data transmission to override a scheduling of the second uplink data transmission based on a determination that the first length is shorter than the second length.

7. A method, comprising:
receiving, by a device comprising a processor, a first downlink control information related to scheduling a first uplink data transmission via a first transmission time interval;
receiving, by the device, a second downlink control information related to scheduling a second uplink data transmission via a second transmission time interval, wherein the second uplink data transmission overlaps at least a symbol with the first uplink data transmission; and
transmitting, by the device, the first uplink data transmission or the second uplink data transmission based on a prioritization determined based on a first length of the first transmission time interval and a second length of the second transmission time interval.

8. The method of claim 7, wherein the prioritization is based on the first length and the second length, and wherein the transmitting the first uplink data transmission or the second uplink data transmission comprises transmitting the second uplink data transmission to override a scheduling of the first uplink data transmission based on a determination that the second length is shorter than the first length.

9. The method of claim 8, wherein the device does not transmit the first uplink data transmission that is overridden by the second uplink data transmission.

10. The method of claim 7, wherein the prioritization is based on the first length and the second length, and wherein the transmitting the first uplink data transmission or the second uplink data transmission comprises transmitting the first uplink data transmission to override a scheduling of the second uplink data transmission based on a determination that the first length is shorter than the second length.

11. A method, comprising:
receiving, by a mobile device comprising a processor, a first scheduling of a first uplink data transmission via a first transmission time interval based on a first downlink control information;
receiving, by the mobile device, a second scheduling of a second uplink data transmission via a second transmission time interval based on a second downlink control information, wherein the second uplink data transmission overlaps at least a symbol with the first uplink data transmission; and
transmitting, by the mobile device, the second uplink data transmission, wherein the second uplink data transmission overrides the first uplink data transmission.

12. The method of claim 11, wherein the second downlink control information is received after a receipt of the first downlink control information.

13. The method of claim 11, wherein the mobile device does not transmit the first uplink data transmission that is overridden by the second uplink data transmission.

14. The method of claim 11, further comprising transmitting, by the mobile device, a third uplink data transmission in at least one non-overlapped symbol of the first uplink data transmission that is overridden by the second uplink data transmission.

15. The method of claim 14, wherein the third uplink data transmission is punctured from the first uplink data transmission that is overridden by the second uplink data transmission.

16. The method of claim 14, wherein a transmission parameter of the third uplink data transmission is derived from the first uplink data transmission that is overridden by the second uplink data transmission.

17. The method of claim 14, wherein the first uplink data transmission comprises a first modulation and coding scheme and the third uplink data transmission comprises a second modulation and coding scheme, wherein the first modulation and coding scheme and the second modulation and coding scheme are a same modulation and coding scheme.

18. The method of claim 14, wherein the first uplink data transmission comprises a first hybrid automatic repeat request process and the third uplink data transmission comprises a second hybrid automatic repeat request process, wherein the first hybrid automatic repeat request process and the second hybrid automatic repeat request process are a same hybrid automatic repeat request process.

19. The method of claim 14, wherein the first uplink data transmission comprises a first transport block size and the third uplink data transmission comprises a second transport block size, wherein the first transport block size and the second transport block size are a same transport block size.

\* \* \* \* \*